(12) United States Patent
Anderson

(10) Patent No.: US 9,720,819 B2
(45) Date of Patent: Aug. 1, 2017

(54) CONCURRENT, MOVING, GARBAGE COLLECTOR

(71) Applicant: Intel Corporation, Santa Clara, CA (US)

(72) Inventor: Todd A Anderson, Hillsboro, OR (US)

(73) Assignee: Intel Corporation, Santa Clara, CA (US)

(*) Notice: Subject to any disclaimer, the term of this patent is extended or adjusted under 35 U.S.C. 154(b) by 129 days.

(21) Appl. No.: 14/737,981

(22) Filed: Jun. 12, 2015

(65) Prior Publication Data

US 2016/0364177 A1    Dec. 15, 2016

(51) Int. Cl.
*G06F 12/00*    (2006.01)
*G06F 12/02*    (2006.01)

(52) U.S. Cl.
CPC .......... *G06F 12/00* (2013.01); *G06F 12/0253* (2013.01); *G06F 12/0269* (2013.01); *G06F 2212/7205* (2013.01)

(58) Field of Classification Search
CPC ...... G06F 3/0608; G06F 3/062; G06F 3/0622; G06F 3/0623; G06F 3/0641; G06F 3/0646; G06F 3/0647; G06F 3/0649; G06F 3/065; G06F 3/0652; G06F 3/0668; G06F 3/067; G06F 3/0671; G06F 3/0673; G06F 3/0674; G06F 3/0677; G06F 3/0679; G06F 3/068; G06F 3/0682; G06F 3/0683; G06F 3/0685; G06F 3/0686; G06F 3/0688; G06F 3/0689; G06F 9/466; G06F 9/467; G06F 9/52; G06F 9/522; G06F 9/524; G06F 9/526; G06F 9/528; G06F 12/023; G06F 12/0246; G06F 12/0253; G06F 12/0261; G06F 12/0269; G06F 12/0276; G06F 2212/2143; G06F 2212/702; G06F 2212/7205; Y10S 707/99951; Y10S 707/99952;
(Continued)

(56) References Cited

U.S. PATENT DOCUMENTS 4,989,134 A * 1/1991 Shaw .................. G06F 12/0269
5,218,698 A * 6/1993 Mandl ................. G06F 12/0269
                                                          711/165
(Continued)

OTHER PUBLICATIONS

Pizlo, Filip, Fragmentation Tolerant Real Time Garbage Collector,: Purdue University, West Lafayette, Indiana, Jun. 2011, 248 pages.*
(Continued)

*Primary Examiner* — Daniel C Chappell
(74) *Attorney, Agent, or Firm* — Grossman, Tucker, Perreault & Pfleger, PLLC

(57) ABSTRACT

Electronic garbage collection moves objects within memory to consolidate the objects thereby reducing access time and improving memory performance. Transactions occurring in an atomic transactional memory appear to occur instantaneously—such that the transaction completes in its entirety or is aborted. A garbage collection circuit attempts to move a memory object from a first memory location to a second memory location using a transactional fast-path move operation. If the transactional fast-path move operation is unsuccessful after a number of attempts, the garbage collection circuit attempts to move the object using a non-transactional slow-path move.

25 Claims, 7 Drawing Sheets

(58) Field of Classification Search
CPC ..... Y10S 707/99953; Y10S 707/99954; Y10S 707/99955; Y10S 707/99956; Y10S 707/99957
See application file for complete search history.

(56) References Cited

U.S. PATENT DOCUMENTS

| | | | | |
|---|---|---|---|---|
| 5,293,614 | A * | 3/1994 | Ferguson | G06F 12/0269 |
| 6,101,580 | A * | 8/2000 | Agesen | G06F 9/5016 707/999.202 |
| 6,289,360 | B1 * | 9/2001 | Kolodner | G06F 12/0269 |
| 6,427,154 | B1 * | 7/2002 | Kolodner | G06F 12/0269 |
| 6,510,498 | B1 * | 1/2003 | Holzle | G06F 9/4862 711/153 |
| 6,912,554 | B2 * | 6/2005 | Yuasa | G06F 12/0269 |
| 7,216,136 | B2 * | 5/2007 | Bacon | G06F 12/0261 |
| 7,975,114 | B2 * | 7/2011 | Tene | G06F 12/0269 707/813 |
| 7,996,642 | B1 * | 8/2011 | Smith | G06F 12/0246 711/154 |
| 8,019,785 | B2 * | 9/2011 | Moir | G06F 9/524 707/796 |
| 8,032,724 | B1 * | 10/2011 | Smith | G06F 12/0269 711/159 |
| 8,108,448 | B2 * | 1/2012 | Siegwart | G06F 12/0253 707/818 |
| 8,621,150 | B2 * | 12/2013 | Serrano | G06F 11/3476 711/118 |
| 9,208,081 | B1 * | 12/2015 | Dice | G06F 12/0269 |
| 2007/0118579 | A1 * | 5/2007 | Hudson | G06F 9/466 |
| 2008/0005520 | A1 * | 1/2008 | Siegwart | G06F 12/0253 711/170 |
| 2008/0281886 | A1 * | 11/2008 | Petrank | G06F 12/0269 |
| 2009/0327372 | A1 * | 12/2009 | Ylonen | G06F 12/0253 |
| 2011/0145304 | A1 * | 6/2011 | Gray | G06F 9/3004 707/820 |
| 2011/0264713 | A1 * | 10/2011 | Ylonen | G06F 12/0269 707/818 |
| 2011/0296133 | A1 * | 12/2011 | Flynn | G06F 11/1048 711/171 |
| 2012/0310987 | A1 * | 12/2012 | Dragojevic | G06F 9/467 707/792 |
| 2013/0238579 | A1 * | 9/2013 | Gray | G06F 9/3004 707/703 |

OTHER PUBLICATIONS

A Novel 64 Bit Data Representation for Garbage Collection and Synchronizing Memory; Alejandro Caro; CSAIL, MIT; Apr. 1997; retrieved from http://csg.csail.mit.edu/pubs/memos/Memo-396/memo-396.pdf on Oct. 8, 2016 (8 pages).*

The transactional memory / garbage collection analogy; Dan Grossman; Proceedings of the 22nd annual ACM SIGPLAN conference on Object-oriented programming systems and applications; Oct. 21, 2007; pp. 695-706 (12 pages).*

Imai, Akira et al., "Evaluation of Parallel Copying Garbage Collection on a Shared-Memory Multiprocessor", IEEE Transactions on Parallel and Distributed Systems, 4(9), 1993, pp. 1030-1040 (11 pages).*

Concurrent and distributed garbage collection of active objects; kafura et al; IEEE Transactions on Parallel and Distributed Systems, vol. 6, iss 4; Apr. 1995; pp. 337-350 (14 pages).*

A fast parallel conservative garbage collector for concurrent object-oriented systems; Matsuoka et al; 1991 International Workshop on Object Orientation in Operating Systems; Oct. 17-18, 1991; pp. 87-93 (7 pages).*

Concurrent replicating garbage collection; O'Toole et al; Proceedings of the 1994 ACM conference on LISP and functional programming; Jul. 1, 1994; pp. 34-42 (9 pages).*

Architectural Support for Software Transactional Memory; Saha et al; Proceedings of the 39th Annual IEEE/ACM International Symposium on Microarchitecture; Dec. 9, 2006; pp. 185-196 (12 pages).*

Evaluating HTM for Pauseless Garbage Collectors in Java; Carpen-Amarie et al; 2015 IEEE Trustcom/BigDataSE/ISPA; Aug. 20-22, 2015 8 pages).*

A shared-memory multiprocessor garbage collector and its evaluation for committed-choice logic programs; Imai et al; Proceedings of the Third IEEE Symposium on Parallel and Distributed Processing; Dec. 2-5, 1991; pp. 870-877 (8 pages).*

Real-time replication garbage collection; Nettles et al; Proceedings of the ACM SIGPLAN 1993 conference on Programming language design and implementation ; Jun. 21-25, 1993; pp. 217-226 (10 pages).*

A concurrent copying garbage collector for languages that distinguish (im)mutable data; Huelsbergen et al; Proceedings of the fourth ACM SIGPLAN symposium on Principles and practice of parallel programming; May 19-22, 1993; pp. 73-82 (10 pages).*

Pizlo, Filip, "Fragmentation Tolerant Real Time Garbage Collection," Purdue University, West Lafayette, Indiana, Jun. 2011, 248 pages.

* cited by examiner

CONCURRENT, MOVING, GARBAGE COLLECTOR

TECHNICAL FIELD

The present disclosure relates to garbage collection in transactional memory systems.

BACKGROUND

Garbage collection is an important feature of modern programming languages that removes the burden of manual memory management from the programmer. Such electronic garbage collection may be classified as either concurrent or stop-the-world. In a stop-the-world garbage collection system, to reclaim memory, all threads are stopped while the garbage collector thread walks all live objects. The process of walking all live threads can take tens of milliseconds, rendering stop-the-world type garbage collection unsuitable for applications having real-time requirements such as video conferencing or telephony. In contrast, concurrent garbage collectors do the work of reclaiming free memory while the other threads in the system continue working. Such concurrent garbage collection systems have reduced "pause" times suitable for use with real-time applications.

Garbage collection systems are further classified as moving or non-moving. Non-moving garbage collection systems do not move objects, resulting in memory fragmentation. Such fragmentation leads to increased allocation overhead, poorer cache locality, and impedes the allocation of large objects in the memory.

A concurrent and moving garbage collection system may create "lost update" issues. With a concurrent and moving garbage collection system, an application thread (mutator) may attempt to write to an object that the garbage collection system is in the process of moving to a new location. If the garbage collection system copies an object's field to a new location and an application thread then attempts to write to the field prior to learning that the object has been moved, the application thread writes to the old location of the object. The garbage collection system will not know the application thread has written to the moved object's old location and will not know to update the new location of the moved object to reflect the update. In such circumstances the update provided to the old location will be "lost" and may result in an error or incorrect execution of the application.

Solutions to the "lost update" problem have been implemented non-transactionally, using software transactional memory, and using hardware transactional memory. The problem with the non-transactional and software transactional memory solutions is that such solutions are inefficient and place a high level of overhead on an application.

BRIEF DESCRIPTION OF THE DRAWINGS

Features and advantages of various embodiments of the claimed subject matter will become apparent as the following Detailed Description proceeds, and upon reference to the Drawings, wherein like numerals designate like parts, and in which:

Figure 1:
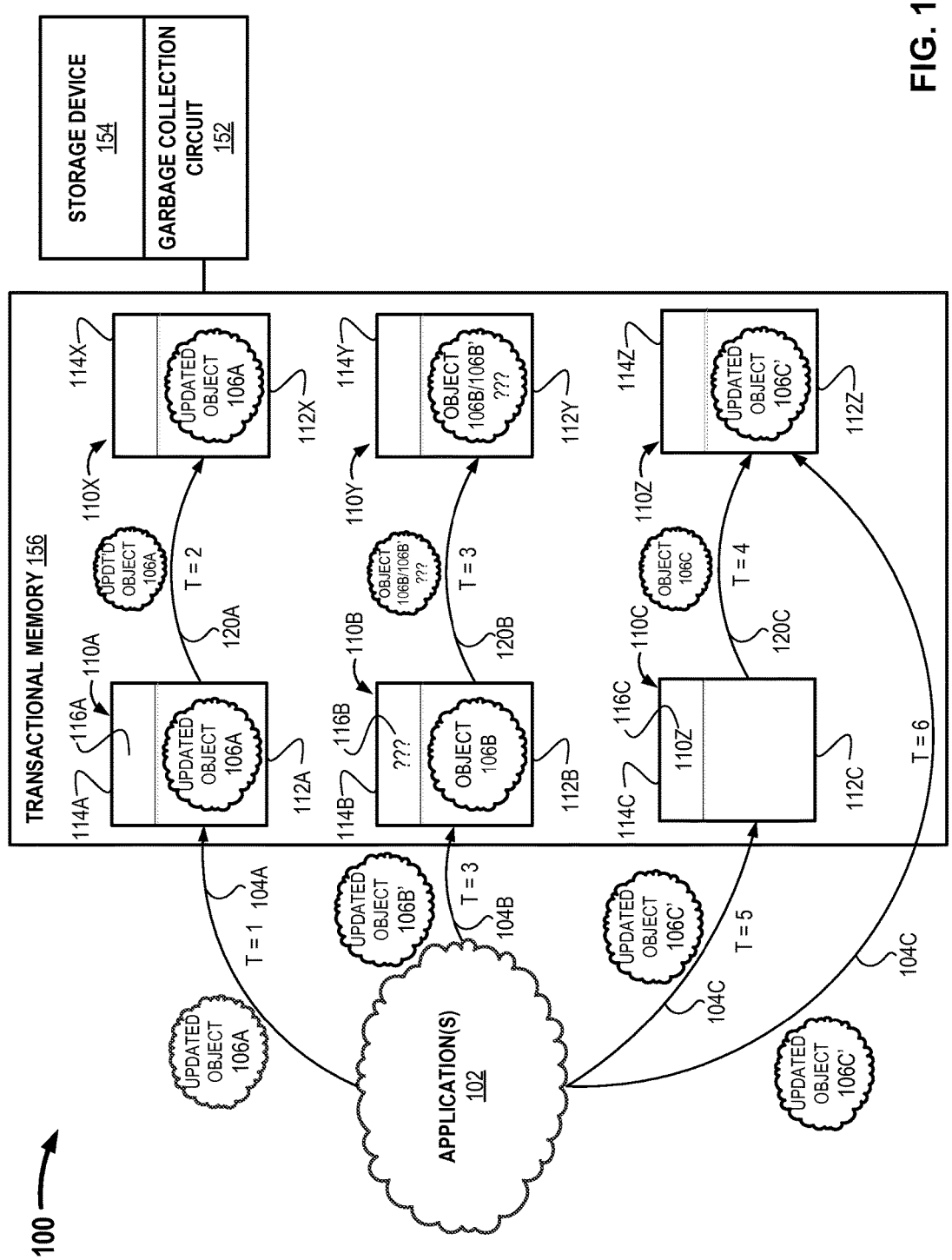
FIG. 1 illustrates an example system capable of providing a concurrent, moving garbage collection system that prevents lost updates, in accordance with at least one embodiment of the present disclosure.

Although the following Detailed Description will proceed with reference being made to illustrative embodiments, many alternatives, modifications and variations thereof will be apparent to those skilled in the art.

DETAILED DESCRIPTION

A concurrent, moving garbage collector can use hardware transactional memory to move objects. By using such a garbage collection system, application threads remain efficient and need not use transactions to perform object updates. A concurrent, moving, garbage collector can take advantage of the strong atomicity property of the hardware transactional memory system to detect contention between an application thread and a garbage collection thread to prevent the lost-update issue by having the garbage collection thread repeat the contended transaction. The high efficiency and low overhead of such a solution offers a marked improvement over non-transactional and software transactional memory system solutions.

Concurrent, moving, garbage collector systems frequently operate in multiple phases. For example, a phase in which the garbage collector determines reachable objects; a phase that moves or compacts the reachable objects; and a phase that ensures all application threads begin working with the new locations of moved objects. Threads that perform the work of the concurrent garbage collection system are referred to as "GC threads." Threads that perform the work of the application are referred to as "mutators." In the systems and methods disclosed herein the GC threads and mutators work synergistically to collaborate and safely move objects. Each memory object includes a "forwarding" field that is used to indicate the current state of the object and provides a new location if the object has been moved. The systems and methods disclosed herein take advantage of the strong atomicity of hardware transactional memory and also accommodate that there is no guarantee of transaction success even after repeated tries (called "eventual success"). GC threads use transactions while mutators do not.

To move an object, a GC thread first attempts a fast-path move in which the GC thread first touches the object to prevent transaction aborting page faults. The GC thread then starts the transaction and determines where to move the object. The GC thread writes the new location to the forwarding field logically associated with the first memory location and ends the transaction. If this fast-path transaction aborts for any reason (e.g., an attempted mutator write to the object), it is retried a defined number of times. If a mutator writes to the object during the attempted transactional fast-path move, strong atomicity causes the garbage collection operation to abort. If the object is updated prior to the transactional fast-path reattempt, the reattempt will copy the updated object that the mutator created. Since eventual success is not guaranteed, the systems and methods disclosed herein also makes use of a default, non-transactional, "fall-back" slow path.

To execute the non-transactional slow path, the GC thread writes data representative of a first logic state (e.g., FORWARDING) to the forwarding field logically associated with the first memory location where the object is stored and performs a handshake with each mutator to confirm that the mutator is able to see the first logic state. If a mutator attempts to write to an object for which the logically associated forwarding field indicates the first logic state, the mutator atomically writes data representative of a second logic state (e.g., WRITTEN) to the forwarding field logically associated with the first memory location. The atomic nature of the transactional memory causes the non-transactional slow-path move to fail upon when the mutator updates the object in the first memory location. Upon failure of the non-transactional slow-path move, the GC thread will retry the non-transactional slow-path move and the now updated object in the first memory location is moved to the second memory location. In such a manner, the lost-update issue is avoided in the circumstance where the mutator writes to the object while the GC thread is attempting a slow-path move. If a mutator does not attempt to update the object in first memory location, the GC thread simply determines a second memory location to move the object and copies the object to the second memory location. The GC thread then atomically sets the forwarding field logically associated with the second memory location to a third logic state (e.g., FORWARDED) that may include data representative of the second memory location. Any future attempt by the mutator to write to the first memory location are redirected to the second memory location.

During the move phase of the GC thread, the mutators may execute a second machine-readable instruction set that includes a GC collaboration code when reading a pointer or writing to an object. The second machine-executable instruction set may, at times, include one or more collaboration codes that are referred to as a READ barrier and a WRITE barrier. The portion of the second machine-readable instruction set that includes the READ barrier collaboration code reads the forwarding field logically associated with an object to determine whether the object has been moved by a GC thread to a new location. If the forwarding field indicates the GC thread has moved the logically associated object, the mutator uses the object in the new location.

The portion of the second machine-readable instruction set that includes the WRITE barrier collaboration code assists in protecting against the lost update issue. The WRITE barrier looks to the forwarding field logically associated with an object to determine whether the forwarding field logically associated with the first memory location is in the first logic state. If the forwarding field logically associated with the first memory location is in the first logic state, the mutator changes the contents of the forwarding field to the second logic state. These steps prevent the lost-update issue during a slow-path move. If the forwarding field logically associated with the first memory location is not in the first logic state, the WRITE barrier collaboration code determines whether the forwarding field logically associated with the first memory location is in the third logic state. If the forwarding field logically associated with the first memory location is in the third logic state, the mutator begins using the object in the new location by applying the update to the object in the new location.

Since the mutator write and the GC thread move operations are not performed transactionally, the potential exists for a "race" between the mutator and the GC thread. Such a race has three potential outcomes: the mutator writes to the object prior to the GC thread moving the object; the mutator writes to the object in the old location while the GC thread moves the object to the new location; or the mutator writes to the object in the old location after the GC thread has moved the object to the new location. If the mutator completes the write operation prior to the GC thread moving the updated object, the GC thread moves the updated object to the new location and no additional action is needed. If the mutator attempts to update the object in the old location while the GC thread is moving the object to the new location, the strong atomicity of the hardware transactional memory will cause the GC move transaction to abort and on a retry by the GC thread, the GC copies the modified object in the old location to the new location.

If the mutator writes to the object in the old location after the GC has completed a move to the new location, the WRITE barrier collaboration code determines whether the forwarding field logically associated with the first memory location contains data representative of the third logic state. If the WRITE barrier collaboration code did not previously detect the forwarding field logically associated with the first memory location included data representative of the third logic state, the WRITE barrier collaboration code determines whether the forwarding field logically associated with the first memory location includes data representative of the third logic state. If the mutator detects the forwarding field logically associated with the first memory location includes data representative of the third logic state, the mutator updates itself to use the new location of the object and performs the write operation on the object in the new location.

The lost update issue is resolved in three ways. First, on the transactional fast-path, the lost update issue is avoided by the strong atomicity induced aborts of the hardware transactional memory that causes the GC thread to retry the transactional fast-path. Second, if the mutator update and the GC transaction occur contemporaneously, the lost update problem is avoided by repeatedly checking the forwarding field logically associated with the first memory location and a repeated update to the new location of the object. Finally, the lost update problem is solved on the slow path by repeatedly attempting to update and move the updated object to the new location selected by the GC thread.

FIG. 1 illustrates an example concurrent, moving garbage collection system 100 that assists in the prevention of lost updates, in accordance with at least one embodiment of the present disclosure. The system 100 includes one or more applications 102 attempting to update a number of objects 106, each stored in a respective location 110A-110Z (collectively, "locations 110") in a transactional memory 156. In at least some implementations, the transactional memory 156 may be realized at least in part as hardware transactional memory 156. In embodiments, the transactional memory 156 demonstrates strong atomicity and provides no guarantee of ultimate success of a particular transaction even upon repeated retries ("eventual success"). A strongly atomic memory protects transactions from interference from non-transactional code. Transactional Synchronization Extensions (TSX) developed by INTEL® Corp. (Santa Clara, Calif.) is an extension to the x86 instruction set that provides an example instruction set supporting transactional memory that demonstrates strong atomicity and no guarantee of eventual success of the transaction.

The application(s) 102 operate on the locations 110 via number of mutator threads 104A-104C (collectively "mutators 104") that may operate on a non-transactional basis to alter or update at least some of the objects 106 stored or otherwise retained in the transactional memory 156. Such object updates may be caused by user interaction with a device such as a personal computer, a laptop computer, a netbook computer, a portable computer, a wearable computer, a smartphone, or handheld computer (collectively, "computing systems") that includes transactional memory 156. Such object updates may be autonomously initiated by one or more applications executed by the computing system, for example by an operating system executing on the computing system.

The concurrent, moving garbage collection system 100 also includes one or more circuits 152 executing one or more machine-readable instruction sets stored in one or more storage devices 154. In embodiments, the one or more machine readable instruction sets causes the one or more circuits 152 to provide a specific machine in the form of a garbage collection circuit 152. The garbage collection circuit 152 causes one or more garbage collection ("GC") threads 120A-120C (collectively "GC threads 120") to move and copy objects from a first memory location to a second memory location to compact or consolidate stored objects and to free larger blocks of memory locations that are able to serially store larger object blocks and, in so doing, reduce object fragmentation and also improve data access times in the memory 156.

In embodiments, GC threads 120 are generally transactional in nature while mutators 104 are generally non-transactional in nature. A transaction, such as those performed by the GC threads 120 may be considered a sequence of operations such as loads and stores that are performed on an all-or-nothing basis, i.e., the transaction commits and atomically completes the sequence of operations or aborts the sequence of operations in their entirety. The strong atomicity of the transactional memory 156 may also require that the non-transactional accesses of the mutators 104 be serialized with respect to the transactional accesses of the GC threads 120.

Each object 106 is stored in a respective location 110 within the transactional memory 156. During execution, the application(s) 102 may modify the objects stored in the transactional memory 156. Contemporaneous with the execution of the application(s) 102, the garbage collection circuit 152 may cause garbage collection threads 120 to move and copy the objects in the transactional memory 156 to improve one or more operating characteristics, such as access time, of the transactional memory 156.

Each of the objects stored in the transactional memory 156 includes a respective forwarding field 114A-114Z (collectively, "forwarding field 114"). The forwarding field 114 may store or otherwise retain information to the mutators 104 on the status of the object 106 logically associated with a respective forwarding field 114. For example, the forwarding field 114A logically associated with a first transactional memory location 110A that stores an object 106A, may store or retain an address corresponding to a second transactional memory location 110B to which a GC thread 120 has moved the object 106A. The timing of GC thread 120 object moves and mutator 104 object writes thus impacts the operational efficiency of the transactional memory 156.

Transactions by the GC threads 120 are attempted a number of times using a transactional fast-path. As a fallback, the GC threads 120 attempt a transactional slow-path if the transactional fast path is aborted each of the number of times. The GC threads 120 are thus able to perform fast-path transactions whenever possible, but have the added security of a slow-path transaction to complete the transaction after the fast-path transaction is aborted a number of times. Such fast-path aborts may be caused for any reason, including a mutator 104 attempting to write to or update the object 106A in the original memory location 110A while the GC thread is moving the object 106A from the original memory location 110A to a destination memory location 110X.

Various transactional scenarios involving the timing between a mutator 104 operation and a GC thread 120 operation are depicted in FIG. 1. In the first transaction, application 102 causes mutator 104A to write a new object 106A to a first memory location 110A at a time T=1. GC thread 120A moves the new object 106A in the first memory location 110A to a second memory location 110X at a subsequent time T=2. After moving the new object 106A to the second memory location 110X, the GC thread 120A may write an address corresponding to the second memory location 110X in forwarding field 114A which is logically associated with first memory location 110A. On subsequent operations involving new object 106A, the mutator 104A will read the pointer (i.e., the address corresponding to the second memory location 110X) in the forwarding field 114A and instead of writing to the new object 106A stored in the first memory location 110A, will instead write to the new object 106A stored in the second memory location 110X.

In a second transaction, application 102 causes mutator 104B to write updated object 106B' to a first memory location 110B that previously held object 106B at T=3. Contemporaneous with mutator 102B writing the updated object 106B' to first memory location 110B (i.e., at T=3), GC thread 120B moves the object in the first memory location 110B to a second memory location 110Y. A conflict between the mutator 104B and the GC thread 120B may occur depending of the relative timing between mutator 104B writing the updated object 106B' and GC thread 120B moving the object stored in the first memory location 110B. In some instances, the GC thread 120B may perform the transaction subsequent to mutator 104B writing the updated object 106B' to the first memory location 110B. In such instances, the transaction executes normally and the updated object 106B' is stored in the second memory location 110Y at the conclusion of the transaction.

In some instances, the mutator 104B may attempt to write an updated object 106B' to the first memory location while the GC thread 120B performs the transaction. In such instances, the conflict between the mutator 104B and the GC thread 120B causes the GC thread 120B to abort and reattempt the transaction. Upon reattempting the transaction, the mutator 104B may have completed writing the updated object 106B' in the first memory location 110B. In such instances, on the transaction reattempt the GC thread 120B moves the updated object 106B' to the second memory location 110Y.

In some instances, the mutator 104B may attempt to update object 106B in the first memory location 110B after the GC thread 120B has moved the object 106B to the second memory location 110Y. In such instances, as part of the transactional fast-path move, the GC thread 102B writes data representative of an address of the second memory location 110Y in the forwarding field 114B logically associated with the first memory location 110B. Thus, the mutator 104B observes the address of the second memory location 110Y and will then update the object in the second memory location 110Y. In such instances, the updated object 106B' is therefore not lost.

In a third transaction, application 102 causes mutator 104C to write updated object 106C' to a first memory location 110C at T=5 that is subsequent to the time at T=4 when the GC thread 120C moved the object 106C to the second memory location 110Z. In such instances, the GC thread 120C updates the information in the forwarding field 114C logically associated with the first memory location 110C to reflect the address of the second memory location 110Z where the GC thread 120C moved the object 106C. The mutator 104C reads the pointer information in the forwarding field 114C logically associated with the first memory location 110C and, at T=6 writes the updated object 106C' to the second memory location 110Z.

The garbage collection circuit 152 includes any number or combination of systems and devices capable of providing GC threads 120 capable of collaboration with one or more mutators 104 generated by application(s) 102. At times, some or all of the one or more mutators 104 may execute a second machine-readable instruction set that may include collaboration code impacting mutator functionality during a read operation (e.g., a READ barrier collaboration) and impacting mutator functionality during a write operation (e.g., a WRITE barrier collaboration). Such collaboration code is described in detail below with regard to FIGS. 3 and 5-7.

In at least some implementations, the garbage collection circuit 152 may be represented by processor executing at least a first machine-readable instruction set retrieved from a communicably coupled storage device 154. In such instances, the first machine-readable instruction set retrieved from the storage device 154 by the processor transform the processor to a particular and specialized garbage collection circuit 152. Such a transformation improves the functionality and usefulness of the circuit by providing garbage collection capabilities absent from the circuit prior to executing the first machine-readable instruction set. In embodiments, the first machine-readable instruction set executed by the circuit creates a physical configuration of components within the circuit to form or otherwise provide the specialized garbage collection circuit 152 and cause the garbage collection circuit 152 to function as described herein.

The storage device 154 includes any number or combination of systems and devices capable of storing or otherwise retaining information, for example in the form of machine-readable instruction sets that when executed by a circuit, cause the processor to provide the garbage collection circuit 152.

Figure 2:
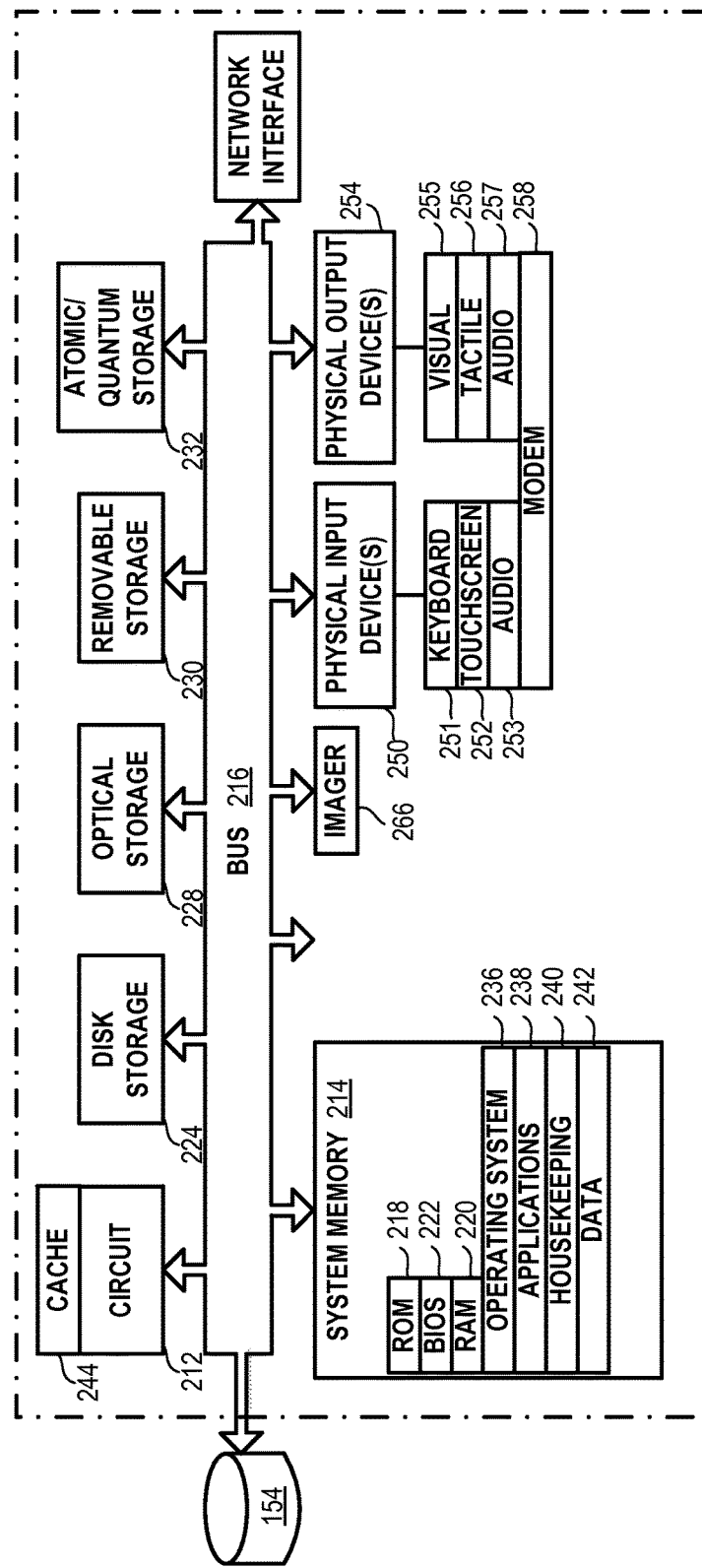
FIG. 2 illustrates an example system on which a concurrent, moving garbage collector such as that described in FIG. 1 may operate, in accordance with at least one embodiment of the present disclosure.

FIG. 2 depicts an illustrative system 200 capable of executing application(s) 102 and in which a garbage collection circuit 152 can be used to improve system speed and efficiency by consolidating objects within memory using transactional fast-path and fallback slow-path moves in collaboration with mutators 104 provided by the application(s) 102, in accordance with at least one embodiment of the present disclosure.

The system 200 may include one or more circuits 212, that transform into one or more particular machines, such as the garbage collection circuit 152 described in FIG. 1, when executing machine-readable instruction sets retrieved from the storage device 154. The system 200 also includes a system memory 214 and a system bus 216 that couples various system components including the system memory 214 to the circuit 212. In embodiments, the circuit 212 may include any number or combination of processing units, such as one or more single- or multi-core microprocessors, one or more controllers, one or more digital signal processors, one or more application-specific integrated circuits (ASICs), one or more systems on a chip (SoCs), one or more reduced instruction set computers (RISCs); one or more field programmable gate arrays (FPGAs), etc. The system bus 216 can employ any known bus structures or architectures, including a memory bus with memory controller, a peripheral bus, and/or a local bus. The system memory 214 includes read-only memory ("ROM") 218 and random access memory ("RAM") 220. In at least some implementations, the RAM 220 may include some or all of the transactional memory 156. A basic input/output system ("BIOS") 222, which can form part of the ROM 218, contains basic routines that facilitate system operations, such as I/O handling.

The system 200 may include one or more disk storage devices 224, one or more optical storage devices 228, one or more removable storage devices 230, one or more atomic or quantum storage devices 232, or combinations thereof. The one or more disk storage devices 224, one or more optical storage devices 228, one or more removable storage devices 230, one or more atomic or quantum storage devices 232 may communicate with the circuit 212 via the system bus 216. The one or more disk storage devices 224, one or more optical storage devices 228, one or more removable storage devices 230, one or more atomic or quantum storage devices 232 may include interfaces or controllers (not shown) coupled between such drives and the system bus 216, as is known by those skilled in the relevant art. The storage devices 224, 228, 230, and 232 provide nonvolatile storage of computer-readable instructions, data structures, program modules and other data generated, created, and/or used by the system 200.

Machine-readable Instruction sets can be stored in the system memory 214. Such machine-readable instruction sets may include, but are not limited to, an operating system 236, one or more application programs 238, housekeeping programs 240 and program data 242. In at least some implementations, the circuit 212 can load machine-readable instruction sets from the storage device 154 into system memory 214 for execution. In implementations, one or more machine-readable instruction sets that transform all or a portion of the circuit 212 into the garbage collection system 152 may be retained in whole or in part into the system memory 214. Program data including one or more applications 102 generating one or more mutators 104 may be stored in whole or in part in a cache 244 communicably coupled to the circuit 212, in system memory 214, or any combination thereof. Application programs 238 may include, but are not limited to one or more sets of collaboration code executed by the mutator application. The collaboration code facilitates the collaboration between the mutators 104 and the GC threads 120 such that in combination with the atomic properties of hardware transactional memory 156, lost updates are reduced in frequency of occurrence.

While shown in FIG. 2 as being stored in the system memory 214, the operating system 236, application programs 238, other programs/modules 240, program data 242 and browser 244 can be stored in whole or in part on the one or more disk storage devices 224, the one or more optical storage devices 228, the one or more removable storage devices 230, the one or more atomic or quantum storage devices 232 or combinations thereof.

An operator may provide commands and information to the system 200 using one or more physical input devices 250. Example physical input devices may include, but are not limited to, one or more keyboards 251, one or more touchscreen devices 252, one or more audio devices 253, or combinations thereof. The physical input devices 250 communicably couple and provide input to the circuit 212 via one or more hardware input/output (I/O) interfaces. Example hardware I/O interfaces can include, but are not limited to, one or more serial interfaces, one or more parallel interfaces, one or more universal serial bus (USB) interfaces, one or more THUNDERBOLT® interfaces, one or more wireless interfaces (e.g., BLUETOOTH®, near field communication, or any similar current or future developed wireless communication technology).

An operator may receive or otherwise perceive system output via one or more physical output devices 254. Example physical output devices 254 may include, but are not limited to, one or more visual output devices 255, one or more tactile output devices 256, one or more audio output devices 257, or any combination thereof. The physical output devices 254 communicably couple and output from the circuit 212 via one or more hardware input/output (I/O) interfaces. Example hardware I/O interfaces can include, but are not limited to, one or more serial interfaces, one or more parallel interfaces, one or more universal serial bus (USB) interfaces, one or more THUNDERBOLT® interfaces, one or more wireless interfaces (e.g., BLUETOOTH®, near field communication, or any similar current or future developed wireless communication technology). One or more modems or similar communications devices may be communicably coupled to the I/O interface.

The system 200 can, at times, operate in a networked computing environment using logical connections to one or more remote computers and/or devices. Such networking may be tethered or wireless and may employ any number, type or combination of wired and/or wireless network architecture, for instance wired and wireless enterprise-wide computer networks, intranets, extranets, and/or the Internet. Other embodiments may include other types of communications networks including telecommunications networks, cellular networks, paging networks, and other mobile networks.

Using memory location 110A as the origin memory location and memory location 110X as an example, to perform a fast-path transaction, the GC thread 120A first touches the object 106A in the origin memory location 110A to prevent transaction aborting page faults. The GC thread 120A then determines the destination memory location 110X for the object 106A. The GC thread 120A starts a transaction. The GC thread 120A copies the object 106A to the destination memory location 110X. The GC thread 120A writes the address of the destination memory location 110A in the forwarding field 114A of the origin memory location 110A. The GC thread 120A finally terminates the transaction. The GC thread 120A will attempt this fast-path transaction a number of times prior to falling back to a slow-path transaction.

Note the GC thread 120A atomically performs the fast-path transaction such that any interruption or failure of the transaction causes the transaction to abort. For example, if a mutator 104A attempts to update the object 106A in the original memory location 110A while the GC thread 120A is performing the fast-path transaction to move the object 106A from the original memory location 110A to the destination memory location 110X, the GC thread 120 will abort the transaction. In such an instance, the mutator 104A will update the object 106 in the original memory location 110A and the GC thread 120A on a subsequent fast-path transaction attempt will move the updated object 106A from the original memory location 110A to the destination memory location 110X.

If the GC thread 120 unsuccessfully attempts to move the object 106A a number of times via a fast-path transaction, the GC thread 120A autonomously falls-back to a slow-path transaction. At times, for example during the garbage collection move phase, the mutator 104A may execute a second machine-readable instruction set that includes collaboration code. At various times, the mutator 104A reads a pointer (e.g., the forwarding field 114A logically associated with the original memory location 106A) or writes to an object 106A. For clarity, the portion of the second machine-readable instruction set providing the collaboration code executed by the mutator 104A during a read operation may be referred to as a "READ barrier" and the portion of the second machine-readable instruction set providing the collaboration code executed by the mutator 104A during a write operation may be referred to as a "WRITE barrier."

Figure 3:
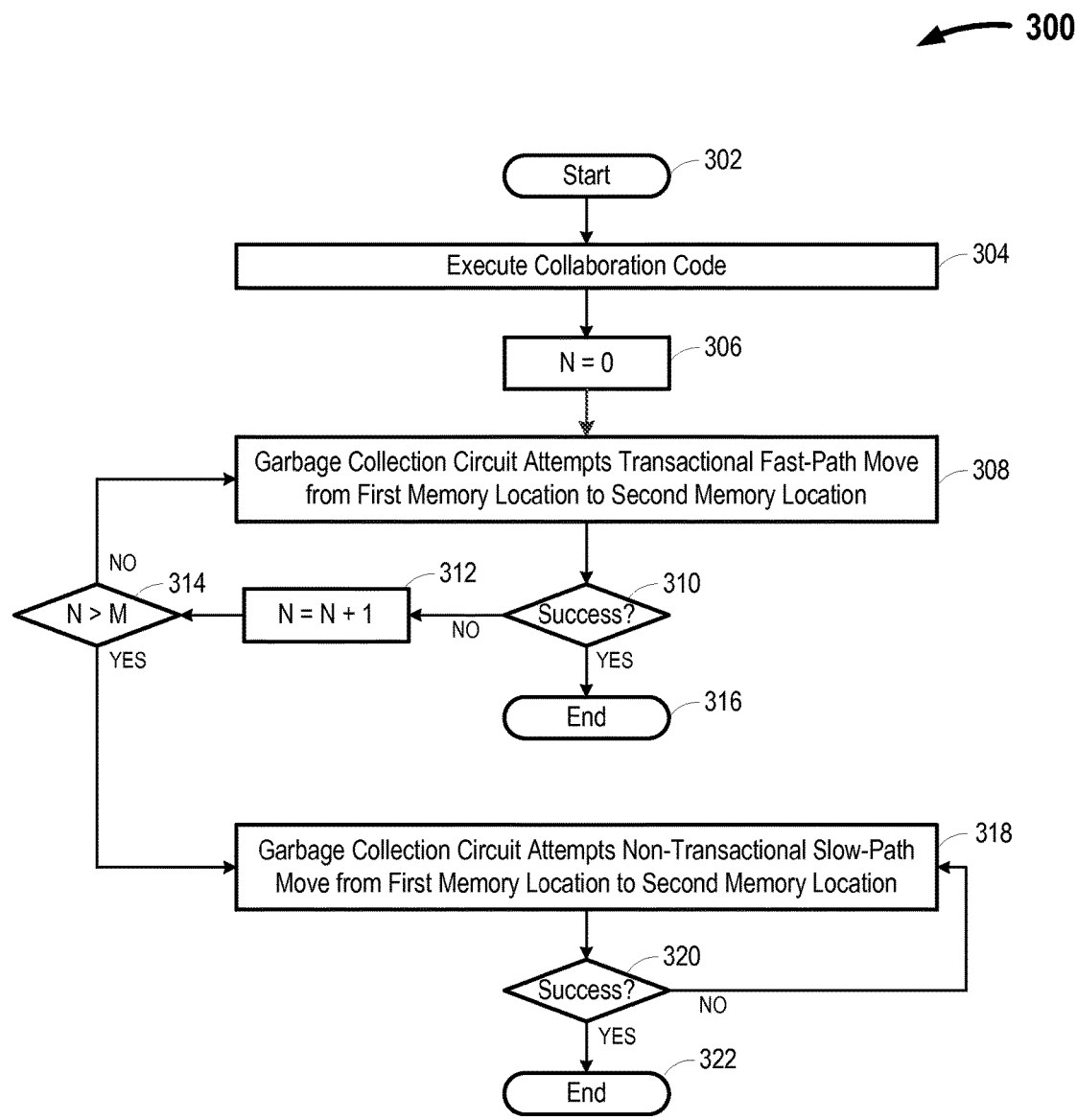
FIG. 3 illustrates a high-level flow diagram of an example method of providing a concurrent, moving, garbage collector using a transactional fast-path move operation and a fallback non-transactional, slow-path move operation, in accordance with at least one embodiment of the present disclosure.

FIG. 3 is a high-level flow diagram of an illustrative garbage collection method 300, in accordance with at least one embodiment of the present disclosure. The garbage collection circuit 152 moves objects within the transactional memory 156 to consolidate objects 106, improving access times and memory usage efficiency. The garbage collection circuit 152 uses a garbage collection thread 120 to move an object 106 from a first memory location 110A to a second memory location 110B. In embodiments, the garbage collection circuit 152 will attempt to move an object 106 a defined number of times using a transactional fast-path move operation. If after unsuccessfully attempting to move the object the defined number of times via the transactional fast-path, the garbage collection circuit 152 will default or fallback to a non-transactional slow-path move operation. The collaboration codes executed by the mutators during the garbage collection move phase may assist in preventing "lost updates" from occurring. A lost update may occur when a mutator updates an object in a memory location that has been moved to a new location by a garbage collection thread. The method 300 commences at 302.

At 304, a mutator executes a collaboration code that permits the mutator 104A and a garbage collection thread 120A to operate cooperatively such that the possibility of a lost update is reduced or eliminated. The collaboration code permits the mutator 104A and the garbage collection thread 120A to cooperatively ensure the object in the second memory location 110X represents the updated object 106A and not the original (i.e., non-updated) object 106A.

At 306, a transactional fast-path counter ("N") is reset to a zero value.

At 308, the garbage collection circuit 152 attempts a transactional fast-path move of an object 106A from a first (origin) memory location 110A to a second (destination)

memory location 110X. The transactional fast-path move may be aborted responsive to one or more events that upset the atomicity of the move operation by the garbage collection thread 120A. For example, if a mutator 104A attempts to write to the object 106A in the first memory location 110A while the garbage collection thread 120A is moving the object to the second memory location 110X, the strongly atomic nature of the transactional memory 156 may cause the transaction to abort.

At 310, if the garbage collection thread 120A successfully moved the object 106A via the transactional fast-path move at 306, the method 300 concludes at 316. If the garbage collection thread 120A was unsuccessful in moving the object 106A to the second memory location 110X at 306, the transactional fast-path move attempt counter is incremented at 312.

At 312, the garbage collection thread 120A compares the number of transactional fast-path move attempts against the defined number of permissible transactional fast-path move attempts to determine whether the number of permissible transactional fast-path move attempts has been made. In embodiments, the number of permissible transactional fast-path move attempts may be 1 transactional fast-path move attempt (N=1); 3 or fewer transactional fast-path move attempts (N≤3); 5 or fewer transactional fast-path move attempts (N≤5); 7 or fewer transactional fast-path move attempts (N≤7); or 10 or fewer transactional fast-path move attempts (N≤10). If the number of permissible transactional fast-path move attempts has been reached at 314, method 300 proceeds to 318.

At 314, the mutator 104A executes a collaboration code that permits the mutator 104A and the garbage collection thread 120A to operate cooperatively such that the possibility of a lost update is reduced or eliminated. The collaboration code permits the mutator 104A and the garbage collection thread 120A to cooperatively ensure the object in the second memory location 110X represents the updated object 106A and not the original (i.e., non-updated) object 106A.

At 318, the garbage collection circuit 152 attempts a non-transactional slow-path move of the object 106A from the first memory location 110A to the second memory location 110X.

At 320, if the garbage collection thread 120A successfully moved the object 106A via the non-transactional slow-path move at 318, the method 300 concludes at 322. If the garbage collection thread 120A was unsuccessful in moving the object 106A to the second memory location 110X via the non-transactional slow-path move at 318, the garbage collection circuit 152 returns to 318 and reattempts the non-transactional slow-path move. Upon successful completion of the non-transactional slow-path move, the method 300 concludes at 322.

Figure 4:
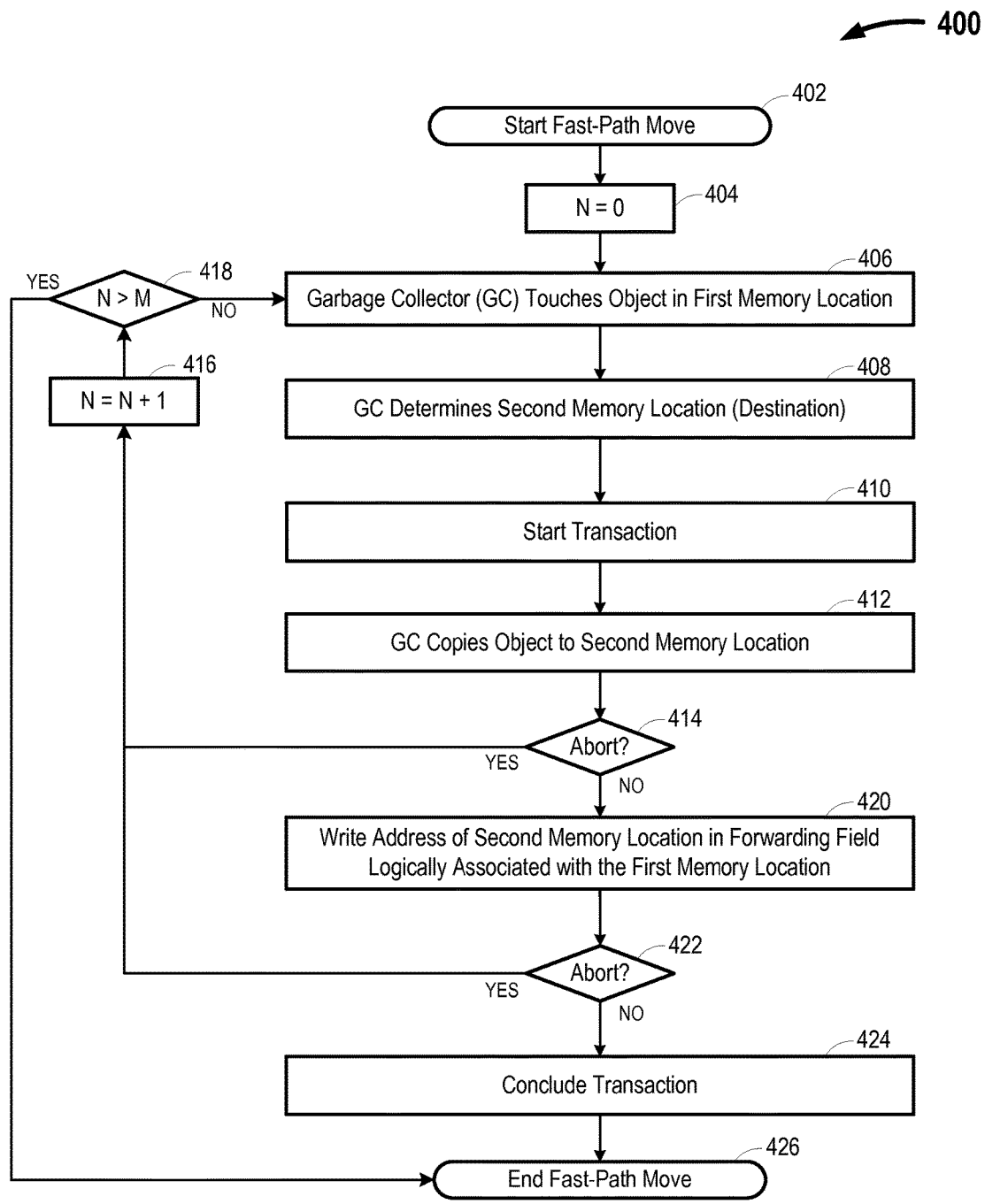
FIG. 4 illustrates a high-level flow diagram of an example transactional fast-path move operation performed at the direction of a garbage collection circuit via a garbage collection thread, in accordance with at least one embodiment of the present disclosure.

FIG. 4 is a high-level flow diagram of an illustrative transactional fast-path method 400 used by the garbage collection circuit 152 to move an object 106A from a first memory location 110A to a second memory location 110X, in accordance with at least one embodiment of the present disclosure. In embodiments, the garbage collection circuit 152 causes a garbage collection thread 152A to perform a transactional high-level move of an object 106A from a first memory location 110A to a second memory location 110X. The garbage collection circuit 152 in 306 as described above with regard to FIG. 3 may, at times, use such a transactional fast-path move. The method 400 commences at 402.

At 404, a transactional fast-path attempt counter ("N") is reset to a zero value.

At 406, the garbage collection circuit 152 causes a garbage collection thread 120A to touch an object 106A in a first memory location 110A. At times, causing the garbage collection thread 120A to touch an object 106A in a first memory location 110A may assist in preventing transaction aborting page faults.

At 408, the garbage collection circuit 152 determines the second (i.e., destination) memory location 110X to which the garbage collection thread 120A will move object 106A.

At 410, the transactional portion of the fast-path move starts.

At 412, the garbage collection thread 120A copies the object 106A to the second (i.e., destination) memory location 110X.

If, at 414, the garbage collection thread 120A aborts and is consequently unsuccessful in moving the object to the second memory location 110X, the transactional fast-path move attempt counter ("N") is incremented at 410. The transactional fast-path move may abort for any one of a number of reasons. For example, if mutator 106A attempts to update object 106A in the first memory location 110A contemporaneous with the garbage collection thread 120A moving object 106A to the second memory location.

At 416, responsive to the garbage collection thread 120A aborting the fast-path move, the transactional fast-path move attempt counter ("N") is incremented.

At 418, the garbage collection circuit 152 compares the number of transactional fast-path move attempts against the defined number of permissible transactional fast-path move attempts to determine whether the number of permissible transactional fast-path move attempts has been made. In embodiments, the number of permissible transactional fast-path move attempts may be 1 transactional fast-path move attempt (N=1); 3 or fewer transactional fast-path move attempts (N≤3); 5 or fewer transactional fast-path move attempts (N≤5); 7 or fewer transactional fast-path move attempts (N≤7); or 10 or fewer transactional fast-path move attempts (N≤10). If the number of permissible transactional fast-path move attempts has been reached at 418, method 400 proceeds to 426 and terminates the transactional fast-path move. If the number of permissible transactional fast-path move attempts have not been reached, the garbage collection circuit 152 causes the garbage collection thread 120A to reattempt the transactional fast-path move by returning to 406.

At 420, the garbage collection thread 120A writes data indicative of the address of the second memory location 110X to which the object 106A has been moved to the forwarding field 114A logically associated with the first memory location 110A where the object 106A was originally stored. By writing the data indicative of the address of the second memory location 110X in the forwarding field 114A of the first memory location 110A, a mutator 104A attempting to update the object 106A in the first memory location 110A will be redirected to update the object in the second memory location 110X. If, at 422, the garbage collection thread 120A aborts while writing the address of the second memory location in the forwarding field 114A logically associated with the first memory location 110A, the transactional fast-path move attempt counter ("N") is incremented at 416 and the method 400 either returns to 406 if the number of permissible transactional fast-path move attempts have not been reached, or proceeds to 426 and ends the fast-path move at 426 if the number of permissible transactional fast-path move attempts has been reached.

At 424, the transactional portion of the fast-path move concludes and the method 400 terminates at 426.

Figure 5:
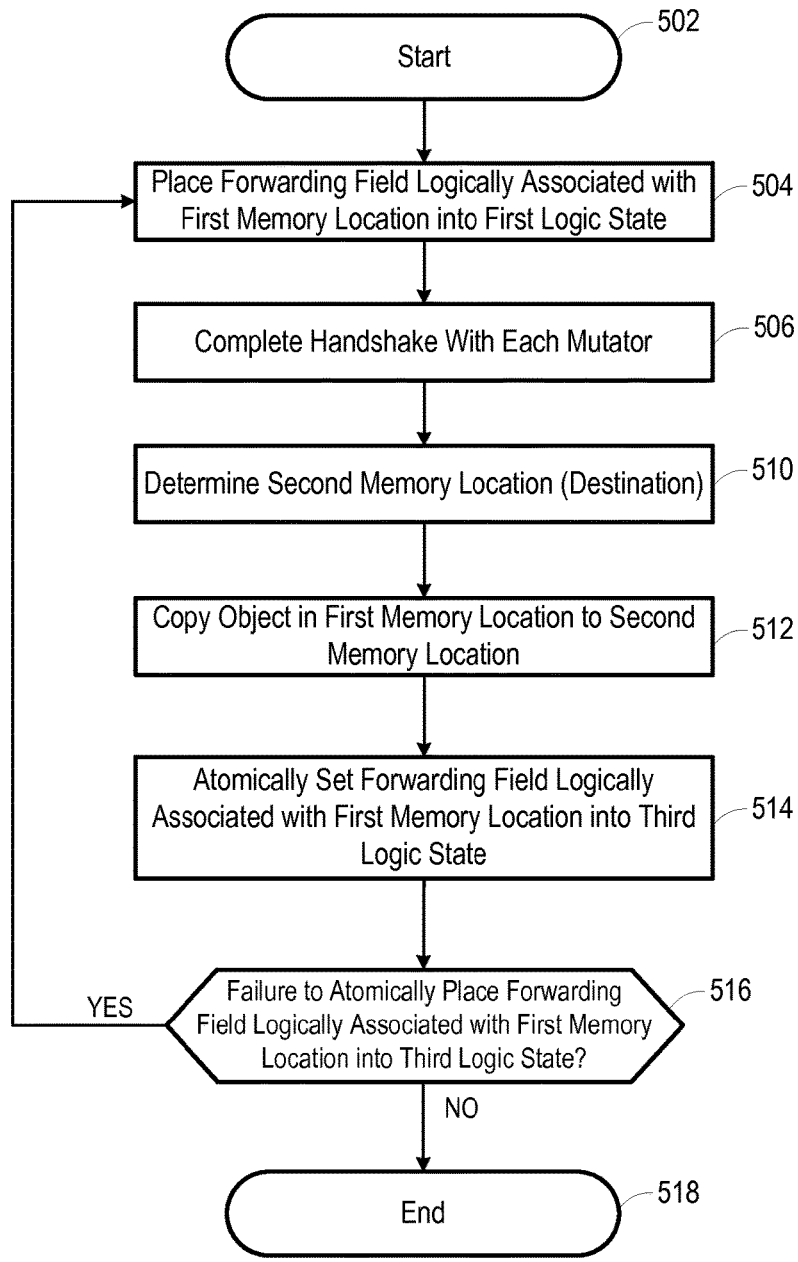
FIG. 5 illustrates a high-level flow diagram of an example non-transactional, slow-path move operation performed at the direction of a garbage collection circuit executing a first machine-readable instruction set, in accordance with at least one embodiment of the present disclosure.

FIG. 5 is a high-level flow diagram of an illustrative non-transactional slow-path method 500 used by the garbage collection circuit 152 and the garbage collection thread 120B, in accordance with at least one embodiment of the present disclosure. In embodiments, if the garbage collection circuit 152 is unable to complete the transactional fast-path move of object 106A after a defined number of attempts, the garbage collection circuit 152 causes the mutator 104B to execute a collaboration code (See FIGS. 6 and 7). The garbage collection circuit 152 at 318 as described above with regard to FIG. 3 may, at times, cause the mutator 104A to execute a collaboration code and use such a non-transactional slow-path move. The example method 500 for performing a non-transactional slow-path move commences at 502.

At 504, the garbage collection circuit 152 causes the garbage collection thread 120B to write or otherwise insert data indicative of a first logic state (e.g., FORWARDING state) in forwarding field 114B logically associated with the first memory location 110B.

At 506, the garbage collection circuit 152 causes the garbage collection thread 120B to perform a handshake with at least some of the mutators 104 writing objects 106 in the transactional memory 156. In embodiments, the garbage collection thread 120B performs the handshake with each of the mutators 104 to ensure the mutators 104 are able to observe the first logic state logically associated with the first memory location 110B. At 510, the garbage collection circuit 152 determines the second memory location 110Y in the transactional memory 156 to which the garbage collection thread 120B will move the object 106B in the first memory location 110B.

At 512, the garbage collection circuit 152 causes the garbage collection thread 120B to move the object 106B to the second memory location 110Y.

At 514, the garbage collection circuit 152 causes the garbage collection thread 120B to atomically set the forwarding field 114B logically associated with the first memory location 110B to a third logic state (e.g., a FORWARDED state).

At 516, if the garbage collection thread 120B aborts atomically setting the forwarding field 114B logically associated with the first memory location 110B to the third logic state, the method 500 returns to 504. If the garbage collection thread 120B does not abort atomically setting the forwarding field 114B logically associated with the first memory location 110B to the third logic state, the method 500 concludes at 518. The garbage collection thread 120B may abort setting the forwarding field 114B logically associated with the first memory location 110B to the third logic state for any of a number of reasons. For example, responsive to a mutator 104B writing data indicative of a second logic state (e.g., a WRITTEN logic state) to the forwarding field 114B logically associated with the first memory location 110B prior to the garbage collection thread 120B setting the forwarding field 114B logically associated with the first memory location 110B to the third logic state.

Figure 6:
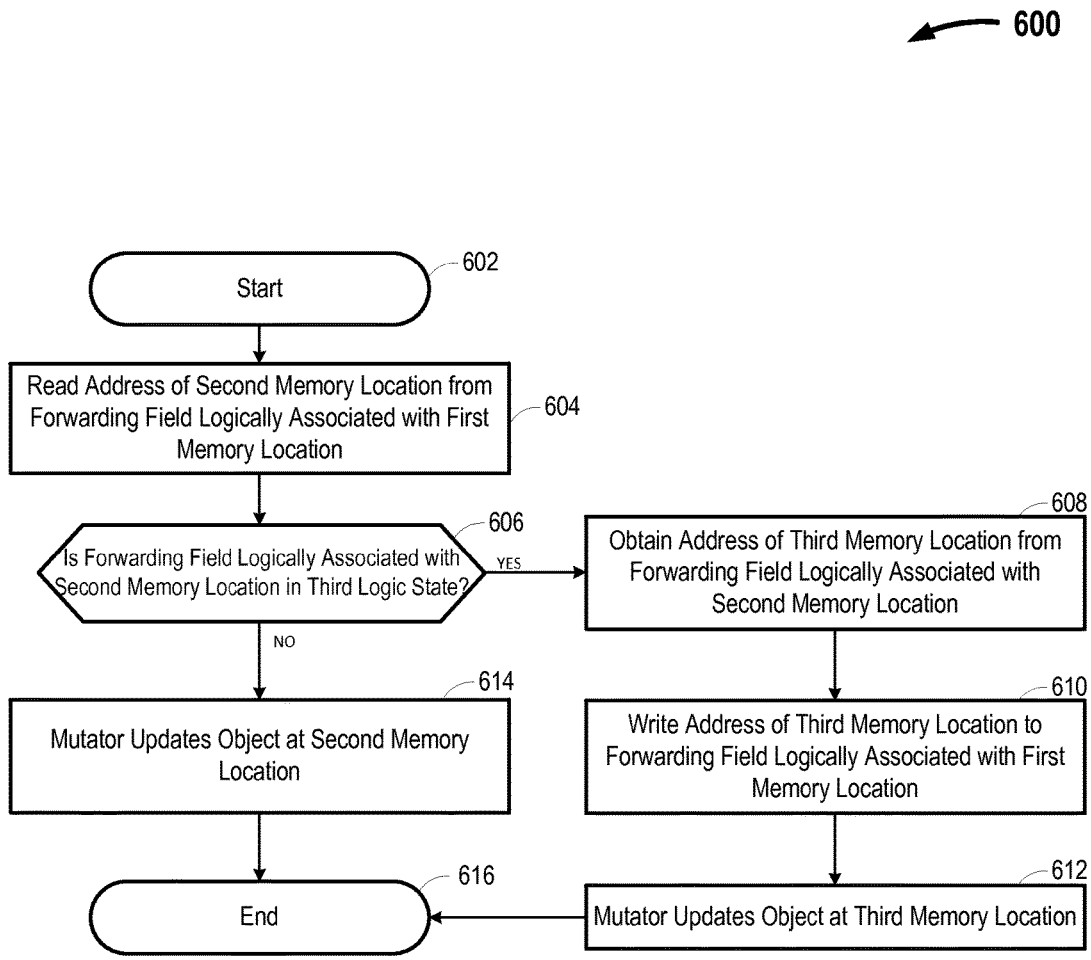
FIG. 6 illustrates a high-level flow diagram of an example non-transactional, slow-path move operation performed by a mutator executing a second machine-readable instruction set that may include a collaboration code, in accordance with at least one embodiment of the present disclosure.

FIG. 6 is a high-level flow diagram of an illustrative method 600 of a first portion of collaboration code used by the mutator 104 to cooperate with a GC thread 120 to move an object 106 in a transactional memory 156 while reducing the possibility of a lost update, in accordance with at least one embodiment of the present disclosure. IN embodiments, the mutator 104 executes a first portion of a collaboration code. In some implementations, the application 102, the garbage collection circuit 152, or a combination thereof may cause the execution of at least some of the first portion of the collaboration code. In embodiments, the collaboration code may cause the mutator 104 to operate cooperatively with the garbage collection thread 120 to move an object from a first memory location in the transactional memory 156 to a second memory location in the transactional memory 156 using a non-transactional slow-path move that minimizes the possibility of a lost update. The example method 600 commences at 602.

At 604, the mutator 104B reads data representative of an address of a second memory location 110Y in the transactional memory 156 from a forwarding field 114B logically associated with a first memory location 110B in the transactional memory 156. When an object 106B is moved in within the transactional memory 156, the entity moving the object 106 (e.g., the GC thread 120B) may insert data indicative of the relocation (e.g., the third logic state, FORWARDED) into the forwarding field logically associated with the first memory location in transactional memory 156 and representative of the address of the second memory location in transactional memory 156 where the object 106 has been moved. By accessing this information, the mutator 106 is made aware of object relocations.

At 606, the mutator 104B examines the forwarding field 114Y logically associated with the second memory location 110Y in the transactional memory 156 to determine whether the forwarding field 114Y includes data indicative of the third logic state (i.e., FORWARDED). The presence of data indicative of the third logic state in forwarding field 114Y provides an indication to the mutator 104B that the object 106B has been moved to a third memory location in the transactional memory 106. If the forwarding field 114Y logically associated with the second memory location 110Y in the transactional memory 156 does NOT include data indicative of the third logic state, the method 600 continues at 614.

At 608, responsive to determining the forwarding field 114Y logically associated with the second memory location 110Y in the transactional memory 156 includes data indicative of the third logic state, the mutator 104B reads data representative of the address corresponding to the third memory location from the forwarding field 114Y. At 610, responsive to reading the data representative of the second address corresponding to the third memory location from the forwarding field 114Y logically associated with the second memory location 110Y in the transactional memory 156, the mutator writes data indicative of the address corresponding to the third memory location to the forwarding field 114B logically associated with the first memory location 110B. After writing the data representative of the third memory location in the forwarding field 114B logically associated with the first memory location 110B, any future operations directed to the first memory location 110B will be pointed to the third memory location in the transactional memory 156 where the object 106B currently resides.

At 612, the mutator 104B updates the object 106B in the third memory location in the transactional memory. The method 600 concludes at 616.

Figure 7:
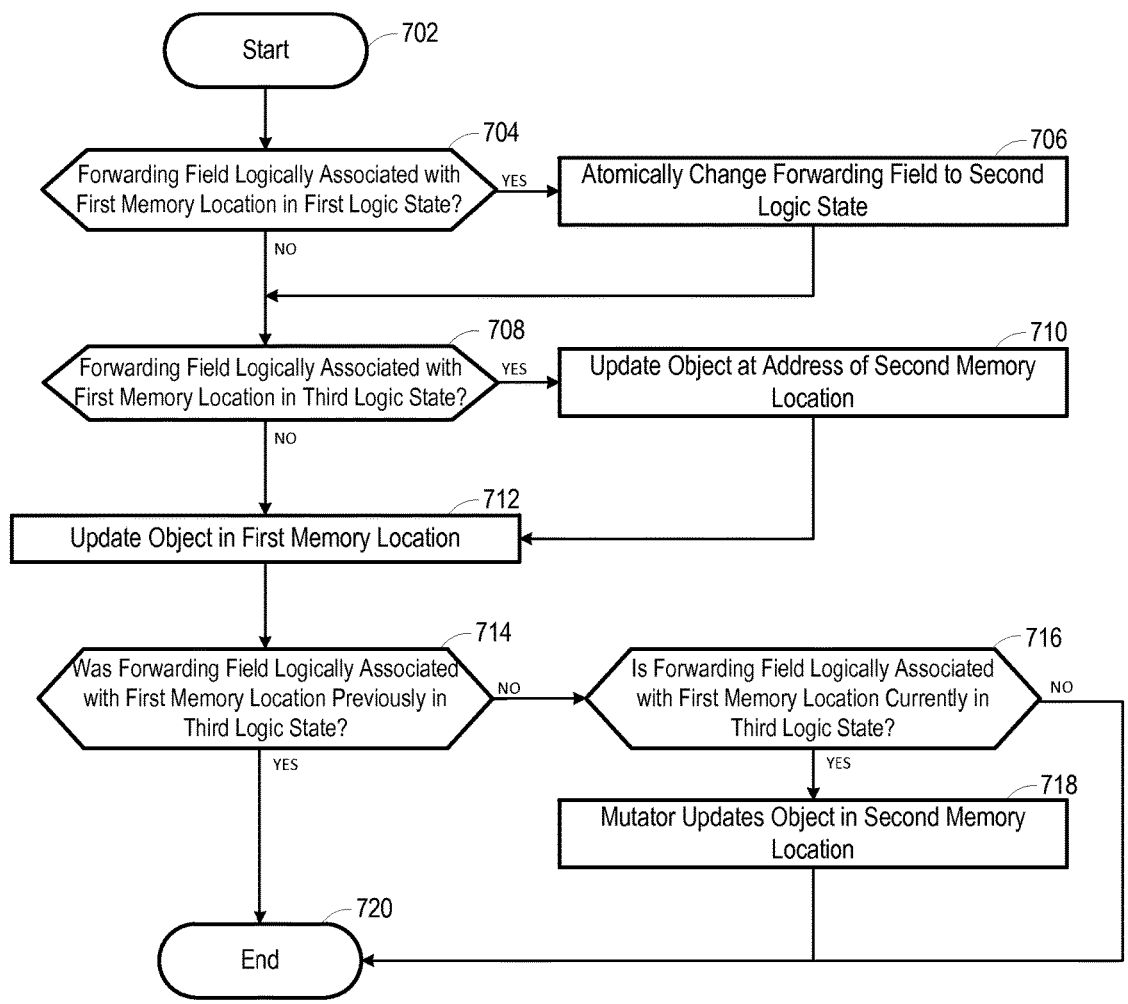
FIG. 7 illustrates a high-level flow diagram of an example non-transactional, slow-path, move operation performed by a mutator executing a second machine-executable instruction set that may include a collaboration code, in in accordance with at least one embodiment of the present disclosure.

At 614, responsive to determining the forwarding field 114Y logically associated with the second memory location 110Y in the transactional memory 156 does NOT include data indicative of the third logic state, the mutator 104B updates object 106B in the second memory location 110Y. The method 600 then concludes at 616. FIG. 7 is a high-level flow diagram of an illustrative method 700 used by the mutator 104 executing a second collaboration code useful for updating an object 106B in transactional memory 156, in accordance with at least one embodiment of the present disclosure. The method 700 commences at 702.

At 704, the garbage collection circuit 152 causes the mutator 104B to determine whether the forwarding field 114B logically associated with the first memory location 110B contains data representative of a first logic state (e.g., a FORWARDING logic state).

At 706, responsive to determining the forwarding field 114B logically associated with the first memory location 110B contains data representative of a first logic state, the mutator 104B changes the data in the forwarding field 114B logically associated with the first memory location 110B to data representative of a second logic state (e.g., a WRITTEN logic state). After atomically changing the forwarding field 114B logically associated with the first memory location 110B to the second logic state, method 700 proceeds at 708.

At 708, responsive to determining the forwarding field 114B logically associated with the first memory location 110B does not contain data representative of the first logic state, the garbage collection circuit 152 causes the mutator 104B to determine whether the forwarding field 114B logically associated with the first memory location 110B contains data representative of a third logic state (e.g., a FORWARDED logic state).

At 710, responsive to determining the forwarding field 114B logically associated with the first memory location 110B contains data representative of the third logic state, the mutator 104B updates the object 106B at the address of the second memory location 110Y that is contained in the forwarding field 114B logically associated with the first memory location 110B. After updating the object 106B at the address of the second memory location 110Y that is contained in the forwarding field 114B logically associated with the first memory location 110B, the method 700 continues at 712.

At 712, responsive to determining the forwarding field 114B logically associated with the first memory location 110B does not contain data representative of the first logic state or the third logic state, the mutator 104B updates the object 106B in the first memory location 110B. At the conclusion of the update, the updated object 106B' resides in the first memory location 110B.

One of three possible scenarios exist when the mutator 104B updates the object 106B in the first memory location 110B. In the first scenario, the mutator 106B updates the object prior to the garbage collection thread 120B moving the updated object 106B' to the second memory location 110Y. In the second scenario, the mutator 104B updates the object 106B in the first memory location 110B contemporaneous with the garbage collection thread 120B moving the object 106B to the second memory location 110Y. In the final scenario, the mutator 104B updates the object 106B in the first memory location 110B after the garbage collection thread 120B has moved the object 106B (i.e., the non-updated object) from the first memory location 110B to the second memory location 110Y.

In the first scenario, where the mutator 106B updates the object prior to the garbage collection thread 120B moving the updated object 106B' to the second memory location 110Y, the garbage collection thread 120B moves the updated object 106B' from the first memory location 110B to the second memory location 110Y. After moving the updated object 106B', the garbage collection thread 120B updates the forwarding field 114B logically associated with the first memory location 110B to include a pointer to an address logically associated with the second memory location 110Y to which the updated object 106B' was moved. Any subsequent attempts by the mutator 104B to update the object 106B in the first memory location 110B are redirected to the second memory location 110Y.

In the second scenario, where the mutator updates the object 106B in the first memory location 110B contemporaneous with the garbage collection thread 120B moving the object 106B to the second memory location 110Y, the mutator 104B uses blocks 704 and 706 to collaborate with the GC if the GC is moving the object with the slow-path and the mutator uses blocks 714, 716, and 718 to collaborate with the GC if the GC is moving the object using the fast path. Blocks 708 and 710 handle when the GC has previously moved the object. The mutator 104B detects that the GC is moving the object using the slow-path by the presence of the first logic state and if that state is detected then the mutator 104B will write data representative of the second logic state (e.g., WRITTEN) to the forwarding field 114B logically associated with the first memory location 110B. The change from the first logic state (e.g., FORWARDING) to the second logic state causes the garbage collection thread 120B to fail the non-transactional, slow-path move operation. Upon reattempting the non-transactional, slow-path move operation, the garbage collection thread 120B moves the now updated object 106B' from the first memory location 110B to the second memory location 110Y. After moving the updated object 106B', the garbage collection thread 120B updates the forwarding field 114B logically associated with the first memory location 110B to include a pointer to an address logically associated with the second memory location 110Y to which the updated object 106B' was moved. Any subsequent attempts by the mutator 104B to update the object 106B in the first memory location 110B are redirected to the second memory location 110Y.

The third scenario is addressed at 714 to 720.

At 714, the collaboration code executed by the mutator 104B causes the mutator 104B to determine whether the forwarding field 114B logically associated with the first memory location 110B previously contained data representative of the third logic state. If the forwarding field 114B logically associated with the first memory location 110B DID previously contain data representative of the third logic state, the method 700 concludes at 720. If the forwarding field 114B logically associated with the first memory location 110B DID NOT previously contain data representative of the third logic state, the method 700 proceeds to 716.

At 716, the collaboration code executed by the mutator 104B causes the mutator 104B to determine whether the forwarding field 114B logically associated with the first memory location 110B currently contains data representative of the third logic state. If the forwarding field 114B logically associated with the first memory location 110B DOES NOT currently contain data representative of the third logic state, the method 700 concludes at 720. If the forwarding field 114B logically associated with the first memory location 110B DOES currently contain data representative of the third logic state, the method continues at 718.

At 718, responsive to the mutator 104B determining the forwarding field 114B logically associated with the first memory location 110B DOES currently contain data representative of the third logic state at 716, the collaboration code executed by the mutator updates the object 106B in the second memory location. The method 700 concludes at 720.

The following examples pertain to further embodiments. The following examples of the present disclosure may comprise subject material such as a device, a method, at least one machine-readable medium for storing instructions that when executed cause a machine to perform acts based on the method, means for performing acts based on the method and/or a system for binding a trusted input session to a trusted output session to prevent the reuse of encrypted data obtained from prior trusted output sessions.

According to example 1 there is provided an electronic garbage collection system for improving memory usage and access. The electronic garbage collection system may include an atomic transactional memory to provide data storage for objects accessible by a number of mutators. The system may include a circuit communicably coupled to the atomic transactional memory. The system may further include a storage device coupled to the circuit and containing a first machine-readable instruction set that, when executed, cause the circuit to operate as a garbage collection circuit, the garbage collection circuit to: attempt a first number of transactional fast path moves of an object from a first memory location in the transactional memory to a second memory location in the transactional memory; and attempt a non-transactional slow-path move of the object from the first memory location to the second memory location responsive to failing to move the object after attempting the first number of transactional fast-path moves.

Example 2 may include elements of example 1 where the storage device includes a second machine-readable instruction set that may cause at least one mutator to read data representative of an address corresponding to the second memory location from a forwarding field logically associated with the first memory location. The second machine-readable instruction set may further cause the at least one mutator to determine, at a first time, the content of a forwarding field logically associated with the second memory location and update the object in the second memory location responsive to the presence of data indicative of at least one of: no logic state, a first logic state, or a second logic state in the forwarding field logically associated with the second memory location.

Example 3 may include elements of example 2 where the second machine-readable instruction set may further cause the at least one mutator to read data representative of an address corresponding to a third memory location in the transactional memory from a forwarding field logically associated with the second memory location responsive to the presence of data indicative of a third logic state in the forwarding field logically associated with the second memory location. The second machine-readable instruction set may further cause the at least one mutator to write data representative of the address corresponding to the third memory location in the forwarding field logically associated with the first memory location and update the object in the third memory location.

Example 4 may include the elements of example 3 where the second machine-readable instruction set may further cause the at least one mutator to read data indicative of a logic state in a forwarding field logically associated with the first memory location and write data indicative of a second logic state in the forwarding field of the object responsive to determining the data presently in the forwarding field logically associated with the first memory location is representative of a first logic state.

Example 5 may include the elements of example 4 where the first machine-readable instruction set may further cause the garbage collection circuit to cause a garbage collection thread to copy an updated object in the first memory location to the second memory location responsive to a mutator updating the object in the first memory location prior to the garbage collection thread moving the updated object from the first memory location to the second memory location.

Example 6 may include the elements of example 5 where the first machine-readable instruction set may further cause the garbage collection circuit to cause a garbage collection thread to abort, based at least in part on the atomic properties of the transactional memory, the move of the object in the first memory location to the second memory location responsive to the mutator updating the object in the first memory location contemporaneous with the garbage collection thread moving the updated object from the first memory location to the second memory location.

Example 7 may include the elements of example 6, where the first machine-readable instruction set may further cause the garbage collection circuit to cause the garbage collection thread to attempt another non-transactional slow-path move to copy an updated object from the first memory location to the second memory location responsive to aborting the move of the object in the first memory location to the second memory location.

Example 8 may include elements of example 4, where the second machine-readable instruction set may further cause the at least one mutator to write the updated object in the second memory location upon detecting the forwarding field logically associated with the first memory location includes data indicative of a third logical state and data indicative of an address of the second memory location.

Example 9 may include elements of example 4, where the second machine-readable instruction set further causes the at least one mutator to determine whether the forwarding field logically associated with the first memory location was previously in the third logic state and terminate the non-transactional slow-path move responsive to determining the forwarding field logically associated with the first memory location was previously in the third logic state.

Example 10 may include elements of example 9 where the second machine-readable instruction set further causes the at least one mutator to determine whether the forwarding field logically associated with the first memory location is currently in the third logic state and update the object in the second memory location responsive to determining the forwarding field logically associated with the first memory location is currently in the third logic state.

According to example 11, there is provided an electronic garbage collection method. The method may include a garbage collection circuit attempting, via a garbage collection thread, a first number of transactional fast-path moves to copy an object from a first memory location in a transactional memory to a second memory location in the transactional memory. The method may additionally include the garbage collection circuit aborting the respective transactional fast-path move responsive to an interruption of the transactional fast-path move. The method may further include the garbage collection circuit attempting, via the garbage collection thread, a non-transactional slow-path move to copy the object from the first memory location to the second memory location responsive to failing to move the object after the first number of transactional fast-path moves. The method may also include the garbage collection circuit repeating the non-transactional slow path-move responsive to a failure of the non-transactional slow-path move.

Example 12 may include elements of example 11 where attempting a non-transactional slow-path move to copy the object from the first memory location to the second memory location may include causing, by the garbage collection circuit, the garbage collection thread to write data representative of a first logic state in a forwarding field logically associated with the first memory location and causing, by the garbage collection circuit, the garbage collection thread to perform a handshake operation with at least one mutator.

Example 13 may include the elements of example 12 where attempting a non-transactional slow-path move to copy the object from the first memory location to the second memory location may include atomically setting, by the garbage collection circuit, the forwarding field logically associated with the first memory location to a third logic state responsive to the garbage collection thread successfully moving the object from the first memory location to the second memory location.

Example 14 may include elements of example 13 where repeating the non-transactional slow-path move responsive to a failure of the non-transactional slow-path move may include failing, by the garbage collection circuit via the garbage collection thread, to atomically set the forwarding field logically associated with the first memory location to the third logic state responsive to the at least one mutator writing data representative of a second logic state to the forwarding field logically associated with the first memory location during the non-transactional slow-path move and repeating, by the garbage collection circuit via the garbage collection thread, the non-transactional slow-path move responsive to failing to atomically set the forwarding field logically associated with the first memory location to the third logic state.

Example 15 may include elements of example 11 and may further include reading, by the at least one mutator, data representative of an address corresponding to the second memory location from a forwarding field logically associated with the first memory location. The method may also include determining, by the at least one mutator, the content of a forwarding field logically associated with the second memory location and updating, by the at least one mutator, the object in the second memory location responsive to determining the content of the a forwarding field logically associated with the second memory location does not include data indicative of the third logic state.

Example 16 may include elements of example 15 and may further include reading, by the at least one mutator, data representative of an address corresponding to a third memory location in the transactional memory from a forwarding field logically associated with the second memory location responsive to the presence of data indicative of a third logic state in the forwarding field logically associated with the second memory location. The method may additionally include writing, by the at least one mutator, data representative of the address corresponding to the third memory location in the forwarding field logically associated with the first memory location and updating, by the at least one mutator, the object in the third memory location.

Example 17 may include elements of example 16 and may further include reading, by the at least one mutator, data indicative of a logic state in a forwarding field logically associated with the first memory location and writing, by the at least one mutator, data indicative of a second logic state in the forwarding field of the object responsive to determining the data presently in the forwarding field logically associated with the first memory location is representative of a first logic state.

Example 18 may include elements of example 17 where attempting, by the garbage collection circuit via the garbage collection thread, a non-transactional slow-path move to copy the object from the first memory location to the second memory location may include copying, by the garbage collection thread, an updated object in the first memory location to the second memory location responsive to the at least one mutator updating the object in the first memory location prior to the garbage collection thread moving the updated object from the first memory location to the second memory location.

Example 19 may include elements of example 17 where attempting, by the garbage collection circuit via the garbage collection thread, a non-transactional slow-path move to copy the object from the first memory location to the second memory location may include aborting, by a garbage collection thread, the move of the object in the first memory location to the second memory location responsive to the mutator updating the object in the first memory location contemporaneous with the garbage collection thread moving the updated object from the first memory location to the second memory location.

Example 20 may include elements of example 19 where attempting, by the garbage collection circuit via the garbage collection thread, a non-transactional slow-path move to copy the object from the first memory location to the second memory location comprises attempting, by the garbage collection thread, another non-transactional slow-path move to copy the updated object from the first memory location to the second memory location responsive to aborting the move of the object in the first memory location to the second memory location.

Example 21 may include elements of example 17 and may further include writing, by the at least one mutator, the updated object in the second memory location upon detecting the forwarding field logically associated with the first memory location includes data indicative of a third logical state and data indicative of an address of the second memory location.

Example 22 may include elements of example 17 and may further include determining, by the at least one mutator, whether the forwarding field logically associated with the first memory location was previously in the third logic state and concluding the non-transactional slow-path move responsive to determining the forwarding field logically associated with the first memory location was previously in the third logic state.

Example 23 may include elements of example 22 and may further include determining, by the at least one mutator, whether the forwarding field logically associated with the first memory location is currently in the third logic state and updating, by the at least one mutator, the object in the second memory location responsive to determining the forwarding field logically associated with the first memory location is currently in the third logic state.

According to example 24, there is provided a storage device including a first machine-readable instruction set, that, when executed by a circuit, may cause the circuit to operate as a garbage collection circuit. The machine-readable instructions may cause the garbage collection circuit to attempt, via a garbage collection thread, a first number of transactional fast-path moves to copy an object from a first memory location in a transactional memory to a second memory location in the transactional memory. The machine-readable instructions may further cause the garbage collection circuit to abort the respective transactional fast-path move responsive to an interruption of the transactional fast-path move. The machine readable instructions may further cause the garbage collection circuit to attempt, via the garbage collection thread, a non-transactional slow-path move to copy the object from the first memory location to the second memory location responsive to failing to move the object after the first number of transactional fast-path moves. The machine-readable instructions may further cause the garbage collection circuit to repeat the non-transactional slow path-move responsive to a failure of the non-transactional slow-path move.

Example 25 may include elements of example 24 and the first machine-readable instruction set that causes the garbage collection circuit to repeat the non-transactional slow path-move responsive to a failure of the non-transactional slow-path move, may further cause the garbage collection circuit to cause the garbage collection thread to write data representative of a first logic state in a forwarding field logically associated with the first memory location and may further cause the garbage collection thread to perform a handshake operation with at least one mutator.

Example 26 may include elements of example 25 and the first machine-readable instruction set that may cause the garbage collection circuit to repeat the non-transactional slow path-move responsive to a failure of the non-transactional slow-path move, may further cause the garbage collection circuit to atomically set the forwarding field logically associated with the first memory location to a third logic state responsive to the garbage collection thread successfully moving the object from the first memory location to the second memory location.

Example 27 may include elements of example 26 and the first machine-readable instruction set that may cause the garbage collection circuit to repeat the non-transactional slow path-move responsive to a failure of the non-transactional slow-path move, may further cause the garbage collection circuit to abort, via the garbage collection thread, the atomic setting of the forwarding field logically associated with the first memory location to the third logic state responsive to the mutator writing data representative of a second logic state to the forwarding field logically associated with the first memory location during the non-transactional slow-path move and repeat, via the garbage collection thread, the non-transactional slow-path move responsive to aborting the atomic setting of the forwarding field logically associated with the first memory location to the third logic state.

Example 28 may include elements of example 27 and may additionally include a second machine-readable instruction set that may cause the mutator to determine the content of a forwarding field logically associated with the second memory location and update the object in the second memory location responsive to determining the content of the a forwarding field logically associated with the second memory location does not include data indicative of the third logic state.

Example 29 may include elements of example 28 and the second machine-readable instruction set may additionally cause the at least one mutator to read data representative of an address corresponding to a third memory location in the transactional memory from a forwarding field logically associated with the second memory location responsive to the presence of data indicative of a third logic state in the forwarding field logically associated with the second memory location. The second machine-readable instruction set may additionally cause the at least one mutator to write data representative of the address corresponding to the third memory location in the forwarding field logically associated with the first memory location and update the object in the third memory location.

Example 30 may include elements of example 29 and the second machine-readable instruction set may further cause the at least one mutator to read data indicative of a logic state in a forwarding field logically associated with the first memory location and write data indicative of a second logic state in the forwarding field of the object responsive to determining the data presently in the forwarding field logically associated with the first memory location is representative of a first logic state.

Example 31 may include elements of example 30 and the first machine-readable instruction set that causes the garbage collection thread to attempt a non-transactional slow-path move to copy the object from the first memory location to the second memory location responsive to failing to move the object after the first number of transactional fast-path moves, may further cause the garbage collection thread to copy an updated object in the first memory location to the second memory location responsive to the at least one mutator updating the object in the first memory location prior to the garbage collection thread moving the updated object from the first memory location to the second memory location.

Example 32 may include elements of example 30 and the first machine-readable instruction set that causes the garbage collection thread to attempt a non-transactional slow-path move to copy the object from the first memory location to the second memory location responsive to failing to move the object after the first number of transactional fast-path moves, may further cause the garbage collection thread to abort the move of the object in the first memory location to the second memory location responsive to the mutator updating the object in the first memory location contemporaneous with the garbage collection thread moving the updated object from the first memory location to the second memory location.

Example 33 may include elements of example 32 where the first machine-readable instruction set that causes the garbage collection thread to attempt a non-transactional slow-path move to copy the object from the first memory location to the second memory location responsive to failing to move the object after the first number of transactional fast-path moves, may further cause the garbage collection thread to attempt another non-transactional slow-path move to copy the updated object from the first memory location to the second memory location responsive to aborting the move of the object in the first memory location to the second memory location.

Example 34 includes elements of example 28 and the second machine-readable instruction set may further cause the at least one mutator to write the updated object in the second memory location upon detecting the forwarding field logically associated with the first memory location includes data indicative of a third logical state and data indicative of an address of the second memory location.

Example 35 includes elements of example 28 and the second machine-readable instruction set may further cause the at least one mutator to determine whether the forwarding field logically associated with the first memory location was previously in the third logic state and terminate the non-transactional slow-path move responsive to determining the forwarding field logically associated with the first memory location was previously in the third logic state.

Example 36 includes elements of example 35 and the second machine-readable instruction set may further cause the at least one mutator to determine whether the forwarding field logically associated with the first memory location is currently in the third logic state and update the object in the second memory location responsive to determining the forwarding field logically associated with the first memory location is currently in the third logic state.

According to example 37, there is provided an electronic garbage collection system. The electronic garbage collection system may include a means for performing a first number of transactional fast-path move attempts, each of the attempts including an attempted copy of an object from a first memory location in a transactional memory to a second memory location in the transactional memory. The system may further include a means for aborting the respective transactional fast-path move attempt responsive to an interruption of the transactional fast-path move. The system may additionally include a means for attempting a non-transactional slow-path move to copy the object from the first memory location in the transactional memory to the second memory location in the transactional memory responsive to unsuccessfully attempting to move the object after the first number of transactional fast-path moves and a means for repeating the non-transactional slow path-move responsive to an interruption of the non-transactional slow-path move.

Example 38 may include elements of example 37 where the means for attempting a non-transactional slow-path move to copy the object from the first memory location to the second memory location may include a means for writing data representative of a first logic state in a forwarding field logically associated with the first memory location and a means for performing a handshake operation with at least one mutator.

Example 39 may include elements of example 38 where the means for attempting a non-transactional slow-path move to copy the object from the first memory location to the second memory location may include a means for atomically setting the forwarding field logically associated with the first memory location to a third logic state responsive to a garbage collection thread successfully moving the object from the first memory location to the second memory location.

Example 40 may include elements of example 39 where the means for repeating the non-transactional slow path-move responsive to an interruption of the non-transactional slow-path move may include a means for preventing the atomic setting of the forwarding field logically associated with the first memory location to the third logic state responsive to at least one mutator writing data representative of a second logic state to the forwarding field logically associated with the first memory location during the non-transactional slow-path move and a means for repeating the non-transactional slow-path move responsive to failing to atomically set the forwarding field logically associated with the first memory location to the third logic state.

Example 41 may include elements of example 37, and may further include a means for reading data representative of an address corresponding to the second memory location from a forwarding field logically associated with the first memory location, a means for determining the content of a forwarding field logically associated with the second memory location, and a means for updating the object in the second memory location responsive to determining the content of the a forwarding field logically associated with the second memory location does not include data indicative of the third logic state.

Example 42 may include elements of example 41 and may additionally include a means for reading data representative of an address corresponding to a third memory location in the transactional memory from a forwarding field logically associated with the second memory location responsive to the presence of data indicative of a third logic state in the forwarding field logically associated with the second memory location, a means for writing data representative of the address corresponding to the third memory location in the forwarding field logically associated with the first memory location, and a means for updating the object in the third memory location.

Example 43 may include elements of example 42 and may additionally include a means for reading data indicative of a logic state in a forwarding field logically associated with the first memory location and a means for writing data indicative of a second logic state in the forwarding field of the object responsive to determining the data presently in the forwarding field logically associated with the first memory location is representative of a first logic state.

Example 44 may include elements of example 43 where the means for attempting a non-transactional slow-path move to copy the object from the first memory location to the second memory location may include a means for copying an updated object in the first memory location to the second memory location responsive to the at least one mutator updating the object in the first memory location prior to the garbage collection thread moving the updated object from the first memory location to the second memory location.

Example 45 may include elements of example 43 where the means for attempting a non-transactional slow-path move to copy the object from the first memory location to the second memory location may include a means for aborting the move of the object in the first memory location to the second memory location responsive to the mutator updating the object in the first memory location contemporaneous with the garbage collection thread moving the updated object from the first memory location to the second memory location.

Example 46 may include elements of example 31 where the means for attempting a non-transactional slow-path move to copy the object from the first memory location to the second memory location may further include a means for attempting another non-transactional slow-path move to copy the updated object from the first memory location to the second memory location responsive to aborting the move of the object in the first memory location to the second memory location.

Example 47 may include elements of example 43 and may further include a means for writing the updated object in the second memory location upon detecting the forwarding field logically associated with the first memory location includes data indicative of a third logical state and data indicative of an address of the second memory location.

Example 48 may include elements of example 43 and may further include a means for determining whether the forwarding field logically associated with the first memory location was previously in the third logic state and a means for concluding the non-transactional slow-path move responsive to determining the forwarding field logically associated with the first memory location was previously in the third logic state.

Example 49 may include elements of example 48 and may further include a means for determining whether the forwarding field logically associated with the first memory location is currently in the third logic state and a means for updating the object in the second memory location responsive to determining the forwarding field logically associated with the first memory location is currently in the third logic state.

According to example 50, there is provided a system for electronic garbage collection via an electronic garbage collection circuit, a transactional fast-path, and a backup non-transactional slow-path, the system being arranged to perform the method of any of examples 11 through 23.

According to example 51, there is provided a chipset arranged to perform the method of any of examples 11 through 23.

According to example 52, there is provided at least one machine readable medium comprising a plurality of instructions that, in response to be being executed on a computing device, cause the computing device to carry out the method according to any of examples 11 through 23.

According to example 53, there is provided a device configured for electronic garbage collection via an electronic garbage collection circuit, a transactional fast-path, and a backup non-transactional slow-path, the device being arranged to perform the method of any of examples 11 through 23.

As used in any embodiment herein, the terms "system" or "module" may refer to, for example, software, firmware and/or circuitry configured to perform any of the aforementioned operations. Software may be embodied as a software package, code, instructions, instruction sets and/or data recorded on non-transitory computer readable storage mediums. Firmware may be embodied as code, instructions or instruction sets and/or data that are hard-coded (e.g., non-volatile) in memory devices. "Circuitry", as used in any embodiment herein, may comprise, for example, singly or in any combination, hardwired circuitry, programmable circuitry such as computer processors comprising one or more individual instruction processing cores, state machine circuitry, and/or firmware that stores instructions executed by programmable circuitry or future computing paradigms including, for example, massive parallelism, analog or quantum computing, hardware embodiments of accelerators such as neural net processors and non-silicon implementations of the above. The modules may, collectively or individually, be embodied as circuitry that forms part of a larger system, for example, an integrated circuit (IC), system on-chip (SoC), desktop computers, laptop computers, tablet computers, servers, smartphones, etc.

Any of the operations described herein may be implemented in a system that includes one or more storage mediums (e.g., non-transitory storage mediums) having stored thereon, individually or in combination, instructions that when executed by one or more processors perform the methods. Here, the processor may include, for example, a server CPU, a mobile device CPU, and/or other programmable circuitry. Also, it is intended that operations described herein may be distributed across a plurality of physical devices, such as processing structures at more than one different physical location. The storage medium may include any type of tangible medium, for example, any type of disk including hard disks, floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), embedded multimedia cards (eMMCs), secure digital input/output (SDIO) cards, magnetic or optical cards, or any type of media suitable for storing electronic instructions. Other embodiments may be implemented as software modules executed by a programmable control device.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed:

1. An electronic garbage collection system for improving memory usage and access, comprising:
    an atomic transactional memory to provide data storage for objects accessible by a number of mutators;
    a circuit communicably coupled to the atomic transactional memory;
    a storage device coupled to the circuit and containing a first machine-readable instruction set that, when executed, causes the circuit to operate as a garbage collection circuit, the garbage collection circuit to:
        attempt a first transactional fast path move of an object from a first memory location in the transactional memory to a second memory location in the transactional memory;
        attempt at least one additional transactional fast path move of the object from a first memory location in the transactional memory to a second memory location in the transactional memory responsive to failing to move the object after the first transactional fast-path move; and
        attempt a non-transactional slow-path move of the object from the first memory location to the second memory location responsive to failing to move the object after attempting the at least two transactional fast-path move attempts.

2. The system of claim 1 wherein the storage device includes a second machine-readable instruction set that causes at least one mutator to:
    read data representative of an address corresponding to the second memory location from a forwarding field logically associated with the first memory location;
    determine, at a first time, the content of a forwarding field logically associated with the second memory location; and
    update the object in the second memory location responsive to the presence of data indicative of at least one of: no logic state, a first logic state, or a second logic state in the forwarding field logically associated with the second memory location.

3. The system of claim 2 wherein the second machine-readable instruction set, further causes the at least one mutator to:
    read data representative of an address corresponding to a third memory location in the transactional memory from a forwarding field logically associated with the second memory location responsive to the presence of data indicative of a third logic state in the forwarding field logically associated with the second memory location;
    write data representative of the address corresponding to the third memory location in the forwarding field logically associated with the first memory location; and
    update the object in the third memory location.

4. The system of claim 3 wherein the second machine-readable instruction set further causes the at least one mutator to:
    read data indicative of a logic state in a forwarding field logically associated with the first memory location; and
    write data indicative of a second logic state in the forwarding field of the object responsive to determining the data presently in the forwarding field logically associated with the first memory location is representative of a first logic state.

5. The system of claim 4 wherein the first machine-readable instruction set further causes the garbage collection circuit to:
cause a garbage collection thread to copy an updated object in the first memory location to the second memory location responsive to a mutator updating the object in the first memory location prior to the garbage collection thread moving the updated object from the first memory location to the second memory location.

6. The system of claim 5 wherein the first machine-readable instruction set further causes the garbage collection circuit to:
cause a garbage collection thread to abort, based at least in part on the atomic properties of the transactional memory, the move of the object in the first memory location to the second memory location responsive to the mutator updating the object in the first memory location contemporaneous with the garbage collection thread moving the updated object from the first memory location to the second memory location.

7. The system of claim 6 wherein the first machine-readable instruction set further causes the garbage collection circuit to:
cause the garbage collection thread to attempt another non-transactional slow-path move to copy an updated object from the first memory location to the second memory location responsive to aborting the move of the object in the first memory location to the second memory location.

8. The system of claim 4 wherein the second machine-readable instruction set further causes the at least one mutator to:
write the updated object in the second memory location upon detecting the forwarding field logically associated with the first memory location includes data indicative of a third logical state and data indicative of an address of the second memory location.

9. The system of claim 4 wherein the second machine-readable instruction set further causes the at least one mutator to:
determine whether the forwarding field logically associated with the first memory location was previously in the third logic state; and
terminate the non-transactional slow-path move responsive to determining the forwarding field logically associated with the first memory location was previously in the third logic state.

10. The system of claim 9 wherein the second machine-readable instruction set further causes the at least one mutator to:
determine whether the forwarding field logically associated with the first memory location is currently in the third logic state; and
update the object in the second memory location responsive to determining the forwarding field logically associated with the first memory location is currently in the third logic state.

11. An electronic garbage collection method comprising:
attempting, by a garbage collection circuit via a garbage collection thread, a first transactional fast-path move to copy an object from a first memory location in a transactional memory to a second memory location in the transactional memory;
attempting, by the garbage collection circuit via the garbage collection thread, at least one additional transactional fast path move of the object from a first memory location in the transactional memory to a second memory location in the transactional memory responsive to failing to move the object after the first transactional fast-path move;
aborting, by the garbage collection circuit, the respective transactional fast-path move responsive to an interruption of the transactional fast-path move;
attempting, by the garbage collection circuit via the garbage collection thread, a non-transactional slow-path move to copy the object from the first memory location to the second memory location responsive to failing to move the object after attempting the plurality of transactional fast-path move attempts; and
repeating, by the garbage collection circuit, the non-transactional slow-path move responsive to a failure of the non-transactional slow-path move.

12. The method of claim 11 wherein attempting a non-transactional slow-path move to copy the object from the first memory location to the second memory location comprises:
causing, by the garbage collection circuit, the garbage collection thread to write data representative of a first logic state in a forwarding field logically associated with the first memory location; and
causing, by the garbage collection circuit, the garbage collection thread to perform a handshake operation with at least one mutator.

13. The method of claim 12 wherein attempting a non-transactional slow-path move to copy the object from the first memory location to the second memory location comprises:
atomically setting, by the garbage collection circuit, the forwarding field logically associated with the first memory location to a third logic state responsive to the garbage collection thread successfully moving the object from the first memory location to the second memory location.

14. The method of claim 13 wherein repeating the non-transactional slow-path move responsive to a failure of the non-transactional slow-path move comprises:
failing, by the garbage collection circuit via the garbage collection thread, to atomically set the forwarding field logically associated with the first memory location to the third logic state responsive to the at least one mutator writing data representative of a second logic state to the forwarding field logically associated with the first memory location during the non-transactional slow-path move; and
repeating, by the garbage collection circuit via the garbage collection thread, the non-transactional slow-path move responsive to failing to atomically set the forwarding field logically associated with the first memory location to the third logic state.

15. The method of claim 11, further comprising:
reading, by the at least one mutator, data representative of an address corresponding to the second memory location from a forwarding field logically associated with the first memory location;
determining, by the at least one mutator, the content of a forwarding field logically associated with the second memory location; and
updating, by the at least one mutator, the object in the second memory location responsive to determining the content of a forwarding field logically associated with the second memory location does not include data indicative of the third logic state.

16. The method of claim 15, further comprising:
reading, by the at least one mutator, data representative of an address corresponding to a third memory location in the transactional memory from a forwarding field logically associated with the second memory location responsive to the presence of data indicative of a third logic state in the forwarding field logically associated with the second memory location;
writing, by the at least one mutator, data representative of the address corresponding to the third memory location in the forwarding field logically associated with the first memory location; and
updating, by the at least one mutator, the object in the third memory location.

17. The method of claim 16, further comprising:
reading, by the at least one mutator, data indicative of a logic state in a forwarding field logically associated with the first memory location; and
writing, by the at least one mutator, data indicative of a second logic state in the forwarding field of the object responsive to determining the data presently in the forwarding field logically associated with the first memory location is representative of a first logic state.

18. The method of claim 17 wherein attempting, by the garbage collection circuit via the garbage collection thread, a non-transactional slow-path move to copy the object from the first memory location to the second memory location comprises:
copying, by the garbage collection thread, an updated object in the first memory location to the second memory location responsive to the at least one mutator updating the object in the first memory location prior to the garbage collection thread moving the updated object from the first memory location to the second memory location.

19. The method of 17 wherein attempting, by the garbage collection circuit via the garbage collection thread, a non-transactional slow-path move to copy the object from the first memory location to the second memory location comprises:
aborting, by a garbage collection thread, the move of the object in the first memory location to the second memory location responsive to the mutator updating the object in the first memory location contemporaneous with the garbage collection thread moving the updated object from the first memory location to the second memory location.

20. The method of 19 wherein attempting, by the garbage collection circuit via the garbage collection thread, a non-transactional slow-path move to copy the object from the first memory location to the second memory location comprises:
attempting, by the garbage collection thread, another non-transactional slow-path move to copy the updated object from the first memory location to the second memory location responsive to aborting the move of the object in the first memory location to the second memory location.

21. The method of claim 17, further comprising:
writing, by the at least one mutator, the updated object in the second memory location upon detecting the forwarding field logically associated with the first memory location includes data indicative of a third logical state and data indicative of an address of the second memory location.

22. The method of claim 17, further comprising:
determining, by the at least one mutator, whether the forwarding field logically associated with the first memory location was previously in the third logic state; and
concluding the non-transactional slow-path move responsive to determining the forwarding field logically associated with the first memory location was previously in the third logic state.

23. The method of claim 22, further comprising:
determining, by the at least one mutator, whether the forwarding field logically associated with the first memory location is currently in the third logic state; and
updating, by the at least one mutator, the object in the second memory location responsive to determining the forwarding field logically associated with the first memory location is currently in the third logic state.

24. A non-transitory storage device including a first machine-readable instruction set, that, when executed by a circuit, causes the circuit to operate as a garbage collection circuit to:
attempt, via a garbage collection thread, a first transactional fast-path move to copy an object from a first memory location in a transactional memory to a second memory location in the transactional memory;
attempt at least one additional transactional fast-path move of the object from a first memory location in the transactional memory to a second memory location in the transactional memory responsive to failing to move the object after the first transactional fast-path move;
abort the respective transactional fast-path move responsive to a failure of the transactional fast-path move;
attempt, via the garbage collection thread, a non-transactional slow-path move to copy the object from the first memory location to the second memory location responsive to failing to move the object after the plurality of transactional fast-path move attempts; and
repeat the non-transaction slow-path move responsive to a failure of the non-transactional slow-path move.

25. An electronic garbage collection system comprising:
a means for attempting a first transactional fast-path move to copy an object from a first memory location in a transactional memory to a second memory location in the transactional memory;
a means for attempting at least one additional transactional fast path move of the object from a first memory location in the transactional memory to a second memory location in the transactional memory responsive to failing to move the object after the first transactional fast-path move;
a means for aborting the respective transactional fast-path move responsive to an interruption of the transactional fast-path move;
a means for attempting a non-transactional slow-path move to copy the object from the first memory location to the second memory location responsive to failing to move the object after the plurality of transactional fast-path move attempts; and
a means for repeating the non-transactional slow-path move responsive to a failure of the non-transactional slow-path move.

* * * * *